(12) United States Patent
Porras et al.

(10) Patent No.: US 7,694,115 B1
(45) Date of Patent: Apr. 6, 2010

(54) NETWORK-BASED ALERT MANAGEMENT SYSTEM

(75) Inventors: Phillip Andrew Porras, Cupertino, CA (US); Martin Wayne Fong, San Francisco, CA (US)

(73) Assignee: SRI International, Menlo Park, CA (US)

(*) Notice: Subject to any disclaimer, the term of this patent is extended or adjusted under 35 U.S.C. 154(b) by 1379 days.

(21) Appl. No.: 09/629,510

(22) Filed: Aug. 1, 2000

Related U.S. Application Data

(63) Continuation of application No. 09/626,547, filed on Jul. 25, 2000, now Pat. No. 6,704,874, and a continuation-in-part of application No. 09/188,739, filed on Nov. 9, 1998, now Pat. No. 6,321,338.

(51) Int. Cl.
  *G06F 11/30* (2006.01)
(52) U.S. Cl. .................... 713/1; 726/23; 709/224; 340/506
(58) Field of Classification Search ............... 713/200, 713/201, 1; 709/224, 227, 223, 229; 714/47, 714/48; 340/426.24, 426.25, 3.1, 506, 286.02; 726/22, 23
See application file for complete search history.

(56) References Cited

U.S. PATENT DOCUMENTS

| | | | | |
|---|---|---|---|---|
| 4,305,097 A | * | 12/1981 | Doemens et al. ............ | 348/126 |
| 4,672,609 A | | 6/1987 | Humphrey et al. ............ | 371/21 |
| 4,773,028 A | | 9/1988 | Tallman ....................... | 364/550 |
| 5,210,704 A | | 5/1993 | Husseiny ................ | 364/551.01 |
| 5,440,498 A | | 8/1995 | Timm | |
| 5,440,723 A | | 8/1995 | Arnold et al. | |
| 5,475,365 A | | 12/1995 | Hoseit et al. | |
| 5,517,429 A | | 5/1996 | Harrison | |
| 5,539,659 A | | 7/1996 | McKee et al. ............... | 709/224 |
| 5,557,742 A | | 9/1996 | Smaha et al. ............... | 395/186 |
| 5,568,471 A | | 10/1996 | Hershey et al. | |
| 5,704,017 A | | 12/1997 | Heckerman et al. | |
| 5,706,210 A | | 1/1998 | Kumano et al. ............. | 709/224 |
| 5,737,319 A | | 4/1998 | Croslin et al. | |
| 5,748,098 A | | 5/1998 | Grace .................... | 340/825.16 |
| 5,790,799 A | | 8/1998 | Mogul ........................ | 709/224 |
| 5,796,942 A | | 8/1998 | Esbensen | |

(Continued)

FOREIGN PATENT DOCUMENTS

WO  99/13427  3/1999

(Continued)

OTHER PUBLICATIONS

Rowland—"Network Attack Trend Analysis"—Nov. 22, 1997—Newsgroups: muc.list.bugtraq.*

(Continued)

*Primary Examiner*—Thuan N Du
(74) *Attorney, Agent, or Firm*—Fish & Richardson P.C.

(57) ABSTRACT

A system for managing network alerts including data connections adapted to receive alerts from network sensors, alert processing logic coupled to the data connections and further including alert integration logic operable to integrate the alerts, report generation logic coupled to the alert integration logic, distribution logic coupled to the report generation logic and a remote management unit coupled to the alert processing logic and being operable to dynamically modify the alert processing logic.

25 Claims, 6 Drawing Sheets

U.S. PATENT DOCUMENTS

| | | | |
|---|---|---|---|
| 5,825,750 A | 10/1998 | Thompson | |
| 5,878,420 A | 3/1999 | De la Salle | 707/10 |
| 5,919,258 A | 7/1999 | Kayashima et al. | |
| 5,922,051 A | 7/1999 | Sidey | 709/223 |
| 5,940,591 A | 8/1999 | Boyle et al. | 395/187.01 |
| 5,966,650 A | 10/1999 | Hobson et al. | |
| 5,974,237 A | 10/1999 | Shurmer et al. | 709/224 |
| 5,974,457 A | 10/1999 | Waclawshy et al. | 709/224 |
| 5,991,881 A | 11/1999 | Conklin et al. | 713/201 |
| 6,009,467 A | 12/1999 | Ratcliff et al. | 709/224 |
| 6,052,709 A | 4/2000 | Paul | 709/202 |
| 6,067,582 A | 5/2000 | Smith et al. | |
| 6,070,244 A | 5/2000 | Orchier et al. | 713/201 |
| 6,092,194 A | 7/2000 | Touboul | |
| 6,119,236 A | 9/2000 | Shipley | |
| 6,138,121 A | 10/2000 | Costa et al. | |
| 6,144,961 A | 11/2000 | De la Salle | 707/10 |
| 6,192,392 B1 | 2/2001 | Ginter | |
| 6,263,441 B1 | 7/2001 | Cromer et al. | |
| 6,269,456 B1 | 7/2001 | Hodges et al. | |
| 6,275,942 B1 | 8/2001 | Bernhard et al. | |
| 6,279,113 B1 | 8/2001 | Vaidya | |
| 6,298,445 B1 | 10/2001 | Shostack et al. | |
| 6,311,274 B1 | 10/2001 | Day | |
| 6,321,338 B1 | 11/2001 | Porras et al. | |
| 6,324,656 B1 | 11/2001 | Gleichauf et al. | |
| 6,353,385 B1 | 3/2002 | Molini et al. | |
| 6,370,648 B1 | 4/2002 | Diep | |
| 6,396,845 B1 | 5/2002 | Sugita | 370/449 |
| 6,405,318 B1 | 6/2002 | Rowland | |
| 6,408,391 B1 * | 6/2002 | Huff et al. | 713/201 |
| 6,442,694 B1 | 8/2002 | Bergman et al. | |
| 6,453,346 B1 | 9/2002 | Garg et al. | 709/224 |
| 6,460,141 B1 | 10/2002 | Olden | 712/201 |
| 6,477,651 B1 | 11/2002 | Teal | |
| 6,499,107 B1 | 12/2002 | Gleichauf et al. | |
| 6,502,082 B1 | 12/2002 | Toyama et al. | |
| 6,519,703 B1 | 2/2003 | Joyce | 713/201 |
| 6,529,954 B1 | 3/2003 | Cookmeyer et al. | |
| 6,532,543 B1 | 3/2003 | Smith et al. | |
| 6,535,227 B1 | 3/2003 | Fox et al. | |
| 6,546,493 B1 | 4/2003 | Magdych et al. | |
| 6,553,378 B1 | 4/2003 | Eschelbeck | |
| 6,681,331 B1 | 1/2004 | Munson et al. | |
| 6,701,459 B2 | 3/2004 | Ramanathan et al. | |
| 6,704,874 B1 | 3/2004 | Porras et al. | |
| 6,707,795 B1 | 3/2004 | Noorhosseini et al. | |
| 6,725,377 B1 | 4/2004 | Kouznetsov | |
| 6,732,167 B1 * | 5/2004 | Swartz et al. | 709/223 |
| 6,751,738 B2 | 6/2004 | Wesinger et al. | |
| 6,826,697 B1 | 11/2004 | Moran | |
| 6,839,850 B1 | 1/2005 | Campbell et al. | |
| 6,947,726 B2 | 9/2005 | Rockwell | |
| 6,971,028 B1 | 11/2005 | Lyle et al. | |
| 2002/0019870 A1 | 2/2002 | Chirashnya et al. | |
| 2002/0032717 A1 | 3/2002 | Malan et al. | 709/105 |
| 2002/0032793 A1 | 3/2002 | Malan et al. | 709/232 |
| 2002/0032880 A1 | 3/2002 | Poletto et al. | 714/4 |
| 2002/0035698 A1 | 3/2002 | Malan et al. | 713/201 |
| 2002/0138753 A1 | 9/2002 | Munson | 713/200 |
| 2002/0144156 A1 | 10/2002 | Copeland, III | 713/201 |
| 2003/0037136 A1 | 2/2003 | Labovitz et al. | 709/224 |
| 2003/0145226 A1 | 7/2003 | Bruton, III et al. | |
| 2003/0172166 A1 | 9/2003 | Judge et al. | |

FOREIGN PATENT DOCUMENTS

| | | |
|---|---|---|
| WO | 99/57626 | 11/1999 |
| WO | WO 99/57625 | 11/1999 |
| WO | 00/10278 | 2/2000 |
| WO | 00/25214 | 5/2000 |
| WO | 00/25527 | 5/2000 |
| WO | 00/34867 | 6/2000 |
| WO | 02/101516 | 12/2002 |
| WO | WO 02/101516 A2 | 12/2002 |
| WO | WO 03/077071 | 9/2003 |

OTHER PUBLICATIONS

Debar et al., "A Neural Network Component for an Intrusion Detection System," © 1992 IEEE.

Denning et al, "Prototype IDES: a Real-Time Intrusion-Detection Expert System," SRI Project ECU 7508, SRI International, Menlo Park, California, Aug. 1987.

Denning et al., "Requirements and Model for IDES—A Real-Time Intrusion-Detection Expert System," SRI Project 6169, SRI International, Menlo Park, CA, Aug. 1985.

Denning, "An Intrusion-Detection Model," SRI International, Menlo Park, CA Technical Report CSL-149, Nov. 1985.

Dowell, "The Computerwatch Data Reduction Tool," AT&T Bell Laboratories, Whippany, New Jersey.

Fox, et al., "A Neural Network Approach Towards Intrusion Detection," Harris Corporation, Government Information Systems Division, Melbourne, FL, Jul. 2, 1990.

Garvey, et al., "Model-Based Intrusion Detection," Proceedings of the 14th national Computer Security Conference, Washington, DC, Oct. 1991.

Ilgun et al., State Transition Analysis: A Rule-Based Intrusion Detection Approach, IEEE Transactions on Software Engineering, vol. 21, No. 3, Mar. 1995.

Javitz et al., "The SRI IDES Statistical Anomaly Detector," Proceedings of the IEEE Symposium on Security and Privacy, Oakland,CA, May 1991. pp. 316-326, IEEE Press.

Javitz et al., "The NIDES Statistical Component Description and Justification, SRI International Annual Report A010," Mar. 7, 1994.

Liepins, et al., "Anomaly Detection; Purpose and Framework," In Proceedings of the 12th National Computer Security Conference, pp. 495-504, Oct. 1989.

Lunt et al., "A Prototype Real-Time Intrusion-Detection Expert System," Proceedings of the 1988 IEEE Symposium on Security and Privacy, Apr. 1988.

Lunt et al., "An Expert System to Classify and Sanitize Text", Proceedings of the 3rd Aerospace Computer Security Conference, Dec. 7-11, 1987, pp. 30-34.

Lunt, "A Survey of Intrusion Detection Techniques," Computers & Security, 12 (1993) 405-418.

Lunt, "Automated Audit Trail Analysis and Intrusion Detection: A Survey," Proceedings of the 11th National Computer Security Conference, Baltimore, MD, Oct. 1988.

Lunt et al., "Knowledge-Based Intrusion Detection", Proceedings of the AI Systems in Government Conference, Washington DC, Mar. 1989.

Porras et al, "EMERALD: Event Monitoring Enabling Responses to Anomalous Live Disturbances," 20th NISSC—Oct. 9, 1997.

Porras et al., "Penetration State Transition Analysis A Rule-Based Intrusion Detection Approach," © 1992 IEEE.

Sebring et al., "Expert systems in intrusion detection: A case study". In Proceedings of the 11th National Computer Security Conference, pp. 74-81, Oct. 1988.

Shieh et al., "A Pattern-Oriented Intrusion-Detection Model and Its Application," © 1991 IEEE.

Smaha, "Haystack: An intrusion detection system". In Proceedings of the Fourth Aerospace Computer Security Applications Conference, pp. 37-44, Dec. 1988.

Snapp, "Signature Analysis and Communication Issues in a Distributed Intrusion Detection System," Master's Thesis, Department of Computer Science, University of California, Davis CA 95616, 1991.

Snapp et al., "DIDS (Distributed Intrusion Detection System)—Motivation, Architecture and An Early Prototype," Computer Security Laboratory, Division of Computer Science, Unic. Of California, Davis, Davis, CA.

Tener, "AI and 4GL: Automated Detection and Investigation Tools", Proceedings of the IFIP Sec. '88, Australia, 1989, pp. 23-29.

Teng et al., "Adaptive Real-Time Anomaly Detection Using Inductively Generated Sequential Patterns," © 1990.

Vaccaro et al., "Detection of Anomalous Computer Session Activity," © 1989 IEEE.

Weiss, "Analysis of Audit and Protocol Data using Methods from Artificial Intelligence," Siemens AG, Munich, West Germany.

Winkler, "A UNIX Prototype for Intrusion and Anomaly Detection in Secure Networks," © Planning Research Corp. 1990.

Boyen, et al., "Tractable Inference for Complex Stochastic Processes," Proceedings of the 14th Annual Conference on Uncertainty in Artificial Intelligence (UAI-98), p. 33-42, Madison, WI, Jul. 24-26, 1998.

Copeland, J., "Observing Network Traffic—Techniques to Sort Out the Good, the Bad, and the Ugly," www.csc.gatech.edu/~copeland/8843/slides/Analyst-011027.ppt, allegedly 2001.

Farshchi, J., "Intrusion Detection FAQ, Statistical based approach to Intrusion Detection," www.sans.org/resources/idfaq/statistic_ids.php, date unknown, printed Jul. 10, 2003.

Goan, T., "A Cop on The Beat, Collecting and Appraising Intrusion Evidence," Communication of the ACM, 42(7), Jul. 1999, 46-52.

Heberlein, et al., "A Network Security Monitor," Proceedings of the IEEE Symposium on Security and Privacy, May 7-9, 1990, Oakland, CA, pp. 296-304, IEEE Press.

Internet Security Systems, "Intrusion Detection for the Millennium," ISS Technology Brief, Date Unknown, p. 1-6.

Jackson, et al., "An Expert System Application For Network Intrusion Detection," Proceedings of the 14th National Computer Security Conference, Washington, DC, Oct. 1-4, 1991.

Lankewicz, et al., "Real-time Anomaly Detection Using a Nonparametric Pattern Recognition Approach", Proceedings of the 7th Annual Computer Security Applications Conference, San Antonio, Texas, 1991, IEEE Press.

Lippmann, et al., "Evaluating Intrusion Detection Systems: The 1998 DARPA Off-line Intrusion Detection Evaluation," Proceedings of the 2000 DARPA, Information Survivability Conference and Exposition, Jan. 25-27, 2000, Hilton Head, SC, vol. 2, pp. 1012-1035, IEEE Press.

Miller, L., "A Network Under Attack, Leverage Your Existing Instrumentation to Recognize and Respond to Hacker Attacks," www.netscout.com/files/Intrusion_020118.pdf, Date Unknown, p. 1-8.

Munson, et al., "Watcher: The Missing Piece of the Security Puzzle," Proceedings of the 17th Annual Computer Security Applications Conference (ACSAC'01), Dec. 10-14, 2001, New Orleans, LA, pp. 230-239, IEEE Press.

NetScreen, Products FAQ, www.netscreen.com/products/faq.html, Date Unknown.

Pearl, J., "Probabilistic Reasoning in Intelligent Systems: Networks of Plausible Inference," Morgan Kaufmann Publishers, Sep. 1988.

Porras, et al., "Live Traffic Analysis of TCP/IP Gateways," Proc. 1998 ISOC Symp. On Network and Distributed Systems Security, Dec. 12, 1997, 1-13.

Skinner, "EMERALD TCP Statistical Analyzer 1998 Evaluation Results," www.sdl.sri.com/emerald/98-eval-estat/index.html, Allegedly dated Jul. 9, 1999.

SRI/Stanford, "Adaptive Model-Based Monitoring and Threat Detection," Information Assurance BAA 98-34.

Staniford-Chen, et al., "GrIDS- A Graph Based Intrusion Detection System for Large Networks," Proceedings of the 19th National Information Systems Security Conference, vol. 1, pp. 361-370, Oct. 1996.

Tener, "Discovery: An Expert System in the Commercial Data Security Environment", Fourth IFIP Symposium on Information Systems Security, Monte Carlo, Dec. 1986.

Valdes, et al., "Adaptive, Model-based Monitoring for Cyber Attack Detection," Proceedings of Recent Advances in Intrusion Detection 2000 (RAID 2000), H. Debar, L. Me, F. Wu (Eds), Toulouse, France, Springer-Verlag LNCS vol. 1907, pp. 80-92, Oct. 2000.

Valdes, A., Blue Sensors, Sensor Correlation, and Alert Fusion, www.raid-symposium.org/raid2000/Materials/Abstracts/41/avaldes_raidB.pdf, Oct. 4, 2000.

Valdes, et al., "Statistical Methods for Computer Usage Anomaly Detection Using NIDES (Next-Generation Intrusion Detection Expert System)," 3rd International Workshop on Rough Sets and Soft Computing, San Jose CA 1995, 306-311.

Wimer, S., "The Core of CylantSecure," White Papers, www.cylant.com/products/core.html, Date Unknown, Alleged © 1999-2003 Cylant Inc., pp. 1-4.

Zhang, et al., "A Hierarchical Anomaly Network Intrusion Detection System using Neural Network Classification," Proceedings of the 2001 WSES International Conference on Neural Networks and Applications (NNA'01), Puerto de la Cruz, Canary Islands, Spain, Feb. 11-15, 2001.

Hartley, B., "Intrusion Detection Systems: What You Need to Know," Business Security Advisor Magazine, Doc # 05257, allegedly dated Sep. 1998, advisor.com/doc/05257, 7 pages, printed Jun. 10, 2003.

Hurwicz, M., "Cracker Tracking: Tighter Security with Intrusion Detection," BYTE.com, allegedly dated May 1998, www.byte.com/art/9805/sec20/art1.htm, 8 pages, printed Jun. 10, 2003.

"Networkers, Intrusion Detection and Scanning with Active Audit," Session 1305, © 1998Cisco Systems, www.cisco.com/networkers/nw99_pres/1305.pdf, 0893-04F9_c3.scr, printed Jun. 10, 2003.

Paller, A., "About the SHADOW Intrusion Detection System" Linux Weekly News, allegedly dated Sep. 1998, lwn.net/1998/0910/shadow.html, 38 pages, printed Jun. 10, 2003.

Cisco Secure Intrusion Detection System, Release 2.1.1, NetRanger User's Guide, Version 2.1.1, © 1998, Cisco Systems, Inc., allegedly released on Apr. 1998, www.cisco.com/univercd/cc/td/doc/product/iaabu/csids/csids3/index.htm, printed Jun. 10, 2003, 334 pages.

Cisco Secure Intrusion Detection System 2.1.1 Release Notes, Table of Contents, Release Notes for NetRanger 2.1.1, © 1992-2002, Cisco Systems, Inc., , allegedly posted Sep. 28, 2002, 29 pages, www.cisco.com/univercd/cc/td/doc/product/iaabu/csids/csids3/nr11new.htm, printed Jun. 10, 2003.

R. Power, et al., "CSI Intrusion Detection System Resource", allegedly dated Jul. 1998, 216.239.57.100/search?q=cache:gvTCojxD6nMJ:www.gocsi.com/ques.htm+site:www.gocsi.com+ques&hl=en&ie=UTF-8, printed Jun. 16, 2003.

Debar, et al., "Towards a Taxonomy of Intrusion-Detection Systems," Computer Networks 31 (1999), 805-822.

Garvey, et al., "An Inference Technique for Integrating Knowledge from Disparate Sources," Proc. IJCAI, Vancouver, B.C., Aug. 1981, 319-325.

Kaven, "The Digital Doorman," PC Magazine, Nov. 16, 1999.

Lindqvist, et al., "Detecting Computer and Network Misuse Through the Production-Based Expert System Toolset (P-BEST)," Oct. 25, 1998.

Anderson, D. et al., "Next-generation Intrusion Detection Expert System (NIDES) A Summary," May 1995.

Anderson, et al., "Next-generation Intrusion Detection Expert System (NIDES) Software Users Manual", Dec. 1994.

Cheeseman, et al., "Bayesian Classification (AutoClass): Theory and Results," in *Advances in Knowledge Discovery and Data Mining*, Usama M. Fayyad, Gregory Piatetsky-Shapiro, Padhraic Smyth, & Ramasamy Uthurusamy, Eds. AAAI Press/MIT Press, 1996. p. 61-83.

Decasper, et al., "Router Plugins A Software Architecture for Next Generation Routers," Proceedings of the ACM SIGCOMM '98 conference on Applications, technologies, architectures, and protocols for computer communication, Vancouver, British Columbia, Canada, pp. 229-240.

Dumouchel, W., "Computer Intrusion Detection Based on Bayes Factors for Comparing Commend Transition Probabilities," NISS, Technical Report No. 91, Feb. 1999.

Frank, J., "Artificial Intelligence and Intrusion Detection: Current and Future Directions," Division of Computer Science, University of California at Davis, Jun. 1994.

Hoagland, et al., "Viewing IDS Alerts: Lessons from SnortSnarf," in Proceedings of DISCEX II, Jun. 2001, 374-386.

Lindquist, et al., "Detecting Computer and Network Misuse Through the Production-Based Expert System Toolset (P-BEST)," in Proceedings of the 1999 Symposium on Security and Privacy, Oakland, CA May 9-12, 1999.

Makris, J., "Firewall Services: More Bark Than Bite," Data Communications, 28 (3), Mar. 1999, 36-50.

Neumann, et al., "Experience with EMERALD to Date," Proceedings of the Workshop on Intrusion Detection and Network Monitoring, 73-80, 1999.

Peterson, K., "IDA- Intrusion Detection Alert," Proc. of the IEEE Annual International Computer Software and Applications Conference, Chicago, IL, Sep. 1992, 306-311.

Ryan, et al., "Intrusion Detection with Neural Networks," Advances in Neural Information Processing Systems 10, Cambridge, MA, MIT Press, 1998.

Complaint for Declaratory Judgment, *Internet Security Systems, Inc., v. SRI International, Inc.*, US District Court, Northern District of Georgia, Civil Action No. 104 CV 2402, filed Aug. 17, 2004.

Complaint for Patent Infringement; Demand for Jury, *SRI International, Inc. v. Internet Security Systems, Inc, etal.*, US District Court, District of Delaware, Case No. 04-1199, Filed Aug. 26, 2004.

The RealSecure 1.2 Manual web.archive.org/web/19970709202745/www.iss.net/eval/manuals.html, alleged dated Jul. 9, 1997.

"Real-time attack recognition and response: A solution for tightening network security", Internet Security Systems, web.archive.org/web/19970721183811/iss.net/prod/whitepaper.html, allegedly dated Jul. 21, 1997.

Roesch, M., "SNORT—Lightweight Intrusion Detection for Networks," Proceedings of LISA '99: 13th Systems Administration Conference, Nov. 7-12, 1999, Seattle, WA 229-238.

Symantec Corporation's Answer and Counterclaims to SRI International, Inc.'s Complaint, *SRI International, Inc. v. Internet Security Systems, Inc. etal.*, US District Court, District of Delaware, Case No. 04-1199, Filed Oct. 15, 2004.

Shostack, A., An overview of SHTTP, pp. 1-7, May 1995.

Radlan, "Intrusion Detection, Extend the Monitoring and Protection of Your Network", Radlan White Paper, pp. 1-7, Feb. 1999.

ISS, "Introduction to RealSecure Version 3.0", pp. 1-46, 1999.

Network Assoc., "Next Generation Intrusion Detection In High-Speed Networks", pp. 1-18, 1999.

Almgren, et al., "A lightweight Tool for Detecting Web Server Attacks," Network and Distributed Systems Security ( NDSS 2000) Symposium Proceedings, pp. 157-170, 2000,copy provided is marked as pp. 1-14.

Almgren, et al., "Application-Integrated Data Collection for Security Monitoring," From Recent Advances in Intrusion Detection (RAID 2001) Springer, Davis, California, pp. 22-36 Oct. 2001 (copy provided comprises of pp. 1-21).

Daniels, et al. "A network Audit System for Host-based Intrusion Detection (NASHID) in Linux," $16^{th}$ annual Computer Security Application Conference (ACSAC 00) pp. 1-10, Dec. 2000.

Daniels, et al. "Identification of Host Audit Data to Detect Attacks on Low-Level IP Vulnerabilities," J. Computer Security, 7 (1), pp. 3-35, 1999.

Dayioglu, "APACHE Intrusion Detection Module," http://yunus.hacettepe.edu.tr/~burak/mod id, pp. 1-6, date Unknown, Downloaded Nov. 10, 2003.

Hollander, Y., "The Future of Web Server Security: Why your web site is still vulnerable to attack," www.cgisecurity.com/lib/wpfuture.pdf, pp. 1-9, allegedly posted 2000.

Lindqvist, et al, "eXpert-BSM: A host-based Intrusion Detection Solution for Sun Solaris," Proc $17^{th}$ Annual Computer security Application Conference, p. 240-251, Dec. 2001 (copy provided comprises of pp. 1-12).

First Amended Complaint for Patent Infringement; *SRI International, Inc. v. Internet Security Systems, Inc. and Symantec Corporation*, U.S. District Court, District of Delaware, Case No. 04-1199 SLR, pp. 1-7 filed Apr. 25, 2005.

Symantec Corporation's Answer and Counterclaims to SRI International, Inc.'s First Amended Complaint, in the action captioned *SRI International, Inc. v. Internet Security Systems, Inc. and Symantec Corporation*, U.S. District Court, District of Delaware Case No. 04-1199 (SLR), pp. 1-15, Certificate of Service dated May 23, 2005.

Answer and Counterclaims of Internet Security Systems, Inc., a Delaware Corporation, in the action captioned *SRI International, Inc., v. Internet Security Systems, Inc. and Symantec Corporation*, U.S. District Court District of Delaware, Case No. 04-1199 (SLR), pp. 1-22, Certificate of Service dated May 23, 2005.

Answer and Counterclaims of Internet Security Systems, Inc, a Georgia Corporation, in the action captioned *SRI International, Inc., v. Internet Security Systems, Inc. and Symantec Corporation*, U.S. District Court, District of Delaware, Case No. 04-1199 (SLR), pp. 1-22, Certificate of Service date May 23, 2005.

Joint Claim Construction Statement, *SRI International, Inc., a California Corporation v. Internet Security Systems, Inc., a Delaware Corporation, Internet Security Systems, Inc., a Georgia Corporation, and Symantec Corporation a Delaware Corporation*, (13 pages), Certificate of Service dated Mar. 17, 2006.

Symantec Corporation's Second Supplemental Responses to SRI International, Inc.'s Interrogatories Nos. 6 and 11, *SRI International, Inc., a California Corporation v. Internet Security Systems, Inc., a Delaware Corporation, Internet Security Systems, Inc., a Georgia Corporation and Symantec Corporation, a Delaware Corporation*, pp. 1-22, Dated Nov. 15, 2005.

Exhibit A-1 to the Symantec Corporation's Second Supplemental Responses to SRI International, Inc.'s Interrogatories Nos. 6 and 11, EMERALD: Event Monitoring Enabling Responses to Anomalous Live Disturbances, "EMERALD 1997", EMERALD 1997 Invalidates the Indicated Claims Under 35 U.S.C. § 102 (b), pp. 1-51, Nov. 15, 2005.

Exhibit A-2 to the Symantec Corporation's Second Supplemental Responses to SRI International, Inc.'s Interrogatories Nos. 6 and 11, Analysis and Response for Intrusion Detection in Large Networks-Summary for CMAD Workshop, "EMERALD-CMAD" , EMERALD—CMAD Invalidates the Indicated Claims Under 35 U.S.C. § 102 (b) and/or 103, pp. 1-33, Nov. 15, 2005.

Exhibit A-3 to the Symantec Corporation's Second Supplemental Responses to SRI International, Inc.'s Interrogatories Nos. 6 and 11, EMERALD: Event Monitoring Enabling Responses to Anomalous Live Disturbances Conceptual Overview, "EMERALD-Conceptual Overview", EMERALD—Conceptual Overview Invalidates the Indicated Claims Under 35 U.S.C. § 102 (b) and/or 103, pp. 1-34, Nov. 15, 2005.

Exhibit A-4 to the Symantec Corporation's Second Supplemental Responses to SRI International, Inc.'s Interrogatories Nos. 6 and 11, Conceptual Design and Planning for EMERALD: Event Monitoring Enabling Responses to Live Disturbances, "EMERALD—Conceptual Design 1997", EMERALD—Conceptual Design 1997 Invalidates the Indicated Claims Under 35 U.S.C. § 102 (b) and/or 103 pp. 1-56, Nov. 15, 2005.

Exhibit A-5 to the Symantec Corporation's Second Supplemental Responses to SRI International Inc.'s Interrogatories Nos. 6 and 11, Live Traffic Analysis of TCP/IP Gateways, "EMERALD—Live Traffic Analysis", EMERALD—Live Traffic Analysis Invalidates the Indicated Claims Under 35 U.S.C. § 102 (b), pp. 1-44, Nov. 15, 2004.

Exhibit A-6 to the Symantec Corporation's Second Supplemental Responses to SRI International, Inc.'s Interrogatories Nos. 6 and 11, Next Generation Intrusion Detection Expert System (NIDES) a Summary, "Network Nides", Network NIDES Invalidates the Indicated Claims Under 35 U.S.C. § 102 (b), pp. 1-40, Nov. 15, 2005.

Exhibit A-7 to the Symantec Corporation's Second Supplemental Responses to SRI International, Inc.'s Interrogatories Nos. 6 and 11, Scalable Intrusion Detection for the Emerging Network, "Ji-Nao", Each of Ji-Nao and Ji-Nao Slides Invalidate the Indicated Claims Under 5 U.S.C. § 102 (b), pp. 1-76, Nov. 15, 2005.

Exhibit A-8 to the Symantec Corporation's Second Supplemental Responses to SRI International Inc.'s Interrogatories Nos. 6 and 11, a Network Security Monitor, "NSM", NSM Invalidates the Indicated Claims Under 35 U.S.C. § 102 (b), pp. 1-9, Nov. 15, 2005.

Exhibit A-9 to the Symantec Corporation's Second Supplemental Responses to SRI International Inc.'s Interrogatories Nos. 6 and 11, Distributed Intrusion Detection System, "DIDS Feb. 1991 and DIDS Oct. 1991", Each of DIDS Feb. 1991 and DIDS Oct. 1991 Invalidate the Indicated Claims Under 35 U.S.C. § 102 (b), pp. 1-88, Nov. 15, 2005.

Exhibit A-10 to the Symantec Corporation's Second Supplemental Responses to SRI International, Inc.'s Interrogatories Nos. 6 and 11, Graph Based Intrusion Detection System for Large Networks, "GRIDS 1996 and GRIDS 1997", GRIDS 1996 and GRIDS 1997 Invalidate the Indicated Claims Under 35 U.S.C. § 102 (b), pp. 1-39, Nov. 15, 2005.

Exhibit A-11 to the Symantec Corporation's Second Supplemental Responses to SRI International Inc.'s Interrogatories Nos. 6 and 11, Wheelgroup Corporation, "Netranger", Each of Netranger User Guide 1.3.1 Invalidate the Indicated Claims Under 35 U.S.C. § 102 (b), pp. 1-34, Nov. 15, 2005.

Exhibit A-12 to the Symantec Corporation's Second Supplemental Responses to SRI International Inc.'s Interrogatories Nos. 6 and 11, Internet Security Systems, "Realsecure", Realsecure Invalidates the Indicated Claims Under 35 U.S.C. § 102 (b), pp. 1-22, Nov. 15, 2005.

Exhibit A-13 to the Symantec Corporation's Second Supplemental Responses to SRI International, Inc.'s Interrogatories Nos. 6 and 11, the Architecture of a Network Level Intrusion Detection System, "Network Level Intrusion Detection", Network Level Intrusion Detection Invalidates the Indicated Claims Under 35 U.S.C. § 102 (b), pp. 1-20, Nov. 15, 200.

Exhibit A-14 to the Symantec Corporation's Second Supplemental Responses to SRI International Inc.'s Interrogatories Nos. 6 and 11, U.S. Patent No. 5,825,750 (Thompson), U.S. Pat. No. 5,825,750 (Thompson) Invalidates the Indicated Claims Under 35 U.S.C. § 102 (a) and 102(e), pp. 1-13, Nov. 15, 2005.

Exhibit A-15 to the Symantec Corporation's Second Supplemental Responses to SRI International, Inc.'s Interrogatories Nos. 6 and 11, Fault Detection in an Ethernet Network Via Anomaly Detectors, Fault Detection in an Ethernet Network Via Anomaly Detectors Invalidates the Indicated Claims Under 35 U.S.C. § 102 (b), pp. 1-9, Nov. 15, 2005.

Exhibit A-16 to the Symantec Corporation's Second Supplemental Responses to SRI International, Inc.'s Interrogatories Nos. 6 and 11, Harris Corporation, "Stake Out Network Surveillance", Stake Out Network Surveillance Invalidates the Indicated Claims Under 35 U.S.C. § 102 (b), pp. 1-12, Nov. 15, 2005.

Exhibit A-17 to the Symantec Corporation's Second Supplemental Responses to SRI International, Inc.'s Interrogatories Nos. 6 and 11, HP Openview for Windows User Guide, "HP Openview", HP Openview and the Internet Standards Invalidate the Indicated Claims Under 35 U.S.C. § 102 (b) and/or 103, pp. 1-29, Nov. 15, 2005.

Exhibit A-18 to the Symantec Corporation's Second Supplemental Responses to SRI International, Inc.'s Interrogatories Nos. 6 and 11, Internetwork Security Monitor, "ISM", ISM and DIDS Invalidate the Indicated Claims Under 35 U.S.C. § 102 (b) or 103, pp. 1-80, Nov. 15, 2005.

Exhibit A-19 to the Symantec Corporation's Second Supplemental Responses to SRI International, Inc.'s Interrogatories Nos. 6 and 11, EMERALD 1997, Intrusive Activity 1991, NIDES 1994, EMERALD 1997, Intrusive Activity 1991, and NIDES 1994 Invalidate the Indicated Claims Under 35 U.S.C. § 102 (b) and/or 103, pp. 1-53, Nov. 15, 2005.

Exhibit A-20 to the Symantec Corporation's Second Supplemental Responses to SRI International, Inc.'s Interrogatories Nos. 6 and 11, Netstalker and HP Openview, Netstalker and HP Openview Invalidate the Indicated Claims Under 35 U.S.C. § 102 (b) and/or 103, pp. 1-32, Nov. 15, 2005.

Exhibit A-21 to the Symantec Corporation's Second Supplemental Responses to SRI International, Inc.'s Interrogatories Nos. 6 and 11,Network Flight Recorder, Network Flight Recorder Invalidates the Indicated Claims Under 35 U.S.C. § 102 (b) and/or 103, pp. 1-53, Nov. 15, 2005.

Exhibit A-22 to the Symantec Corporation's Second Supplemental Responses to SRI International, Inc.'s Interrogatories Nos. 6 and 11, Automated Information System "AIS", AIS Invalidates the Indicated Claims Under 35 U.S.C. § 102 (b), pp. 1-21, Nov. 15, 2005.

Exhibit A-23 to the Symantec Corporation's Second Supplemental Responses to SRI International, Inc.'s Interrogatories Nos. 6 and 11, Comparison of Listed Publications to Claims—At-Issue of SRI's Patent-In-Suit for 35 U.S.C. § 103, pp. 1-57, Nov. 15, 2005.

Supplemental Responses and Objections of ISS-GA and ISS-DE to SRI's Interrogatory Nos. 6 & 11, *SRI International, Inc., a California Corporation* v. *Internet Security Systems Inc., a Delaware Corporation, Internet Security Systems, Inc., a Georgia Corporation, and Symantec Corporation, a Delaware Corporation*, pp. 1-22, Certificate of Service dated Nov. 15, 2005.

Exhibit 1 to the Supplemental Responses and Objections of ISS-GA and ISS-DE to SRI's Interrogatory Nos. 6 & 11, EMERALD 1997 Invalidates the Indicated Claims Under 35 U.S.C. § 102 (b), pp. 1-60, Nov. 15, 2005.

Exhibit 2 to the Supplemental Responses and Objections of ISS-GA and ISS-DE to SRI's Interrogatory Nos. 6 & 11, CMAD Invalidates the Indicated Claims Under 35 U.S.C. § 102 (b) and/or 103,pp. 1-27, Nov. 15, 2005.

Exhibit 3 to the Supplemental Responses and Objections of ISS-GA and ISS-DE to SRI's Interrogatory Nos. 6 & 11, EMERALD Conceptual Overview Invalidates the Indicated Claims Under 35 U.S.C.§ 102 (b) and/or 103, pp. 1-35, Nov. 15, 2005.

Exhibit 4 to the Supplemental Responses and Objections of ISS-GA and ISS-DE to SRI's Interrogatory Nos. 6 & 11, Conceptual Design and Planning for EMERALD: Event Monitoring Enabling Responses to Anomalous Live Disturbances Version 1.2, May 20, 1997Invalidate the Indicated Claims Under 35 U.S.C.§ 102 (b) and/or 103, pp. 1-58, Nov. 15, 2005.

Exhibit 5 to the Supplemental Responses and Objections of ISS-GA and ISS-DE to SRI's Interrogatory Nos. 6 & 11, Live Traffic Analysis Invalidates the Indicated Claims Under 35 U.S.C.§ 102 (b), pp. 1-52, Nov. 15, 2005.

Exhibit 6 to the Supplemental Responses and Objections of ISS-GA and ISS-DE to SRI's Interrogatory Nos. 6 & 11, Next-Generation Intrusion Detection Expert System (NIDES): a Summary Invalidates the Indicated Claims Under 35 U.S.C.§ 102 (b), pp. 1-47, Nov. 15, 2005.

Exhibit 7 to the Supplemental Responses and Objections of ISS-GA and ISS-DE to SRI's Interrogatory Nos. 6 & 11, Ji-Nao Invalidates the Indicated Claims Under 35 U.S.C.§ 102 (b), pp. 1-100, Nov. 15, 2005.

Exhibit 8 to the Supplemental Responses and Objections of ISS-GA and ISS-DE to SRI's Interrogatory Nos. 6 & 11, NSM Invalidates the Indicated Claims Under 35 U.S.C.§ 102 (b), pp. 1-17, Nov. 15, 2005.

Exhibit 9 to the Supplemental Responses and Objections of ISS-GA and ISS-DE to SRI's Interrogatory Nos. 6 & 11, DIDS Invalidates the Indicated Cliams Under 35 U.S.C.§ 102 (b), pp. 1-114, Nov. 15, 2005.

Exhibit 10 to the Supplemental Responses and Objections of ISS-GA and ISS-DE to SRI's Interrogatory Nos. 6 & 11, ISM and DIDS Invalidate the Indicated Claims Under 35 U.S.C. § 102 (b) or 103. pp. 1-91, Nov. 15, 2005.

Exhibit 11 to the Supplemental Responses and Objections of ISS-GA and ISS-DE to SRI's Interrogatory Nos. 6 & 11, GrIDS Invalidates the Indicated Claims Under 35 U.S.C.§ 102 (b), pp. 1-41, Nov. 15. 2005.

Exhibit 12 to the Supplemental Responses and Objections of ISS-GA and ISS-DE to SRI's Interrogatory Nos. 6 & 11, Netranger Invalidates the Indicated Claims Under 35 U.S.C.§ 102 (b), pp. 1-32, Nov. 15, 2005.

Exhibit 13 to the Supplemental Responses and Objections of ISS-GA and ISS-DE to SRI's Interrogatory Nos. 6 & 11, Realsecure Invalidates the Indicated Claims Under 35 U.S.C.§ 102 (b), pp. 1-21, Nov. 15, 2005.

Exhibit 14 to the Supplemental Responses and Objections of ISS-GA and ISS-DE to SRI's Interrogatory Nos. 6 & 11, The Network Flight Recorder System Invalidates the Indicated Claims Under 35 U.S.C. § 102 (b) and/or 103, pp. 1-73, Nov. 15, 2005.

Exhibit 15 to the Supplemental Responses and Objections of ISS-GA and ISS-DE to SRI's Interrogatory Nos. 6 & 11, Netstalker and HP Openview Invalidate the Indicated Claims Under 35 U.S.C. § 102 (b) and/or 103, pp. 1-21, Nov. 15, 2005.

Exhibit 16 to the Supplemental Responses and Objections of ISS-GA and ISS-DE to SRI's Interrogatory Nos. 6 & 11, HP Openview and the Internet Standards Invalidate the Indicated Claims Under 35 U.S.C. § 102 (b) and/or 103, pp. 1-26, Nov. 15, 2005.

Exhibit 17 to the Supplemental Responses and Objections of ISS-GA and ISS-DE to SRI's Interrogatory Nos. 6 & 11, "Network Level Intrusion Detection System" (Aug. 1990) Invalidates the Indicated Claims Under 35 U.S.C. § 102 (b), pp. 1-22, Nov. 15, 2005.

Exhibit 18 to the Supplemental Responses and Objections of ISS-GA and ISS-DE to SRI's Interrogatory Nos. 6 & 11, US Patent No.

5,825,750 (Thompson) Invalidates the Indicated Claims Under 35 U.S.C. § 102 (a) and 102 (e), pp. 1-21, Nov. 15, 2005.
Exhibit 19 to the Supplemental Responses and Objections of ISS-GA and ISS-DE to SRI's Interrogatory Nos. 6 & 11, "Fault Detection in an Ethernet Network Via Anomaly Detectors" Invalidates the Indicated Claims Under 35 U.S.C. § 102 (b), pp. 1-17, Nov. 15, 2005.
Exhibit 20 to the Supplemental Responses and Objections of ISS-GA and ISS-DE to SRI's Interrogatory Nos. 6 & 11, Stake Out Network Surveillance Invalidates the Indicated Claims Under 35 U.S.C. § 102 (b), pp. 1-24, Nov. 15, 2005.
Exhibit 21 to the Supplemental Responses and Objections of ISS-GA and ISS-DE to SRI's Interrogatory Nos. 6 & 11, EMERALD 1997, Intrusive Activity 1991, and NIDES 1994 Invalidate the Indicated Claims Under 35 U.S.C. § 102 (b) or 103,pp. 1-62, Nov. 15, 2005.
Exhibit 22 to the Supplemental Responses and Objections of ISS-GA and ISS-DE to SRI's Interrogatory Nos. 6 & 11, Automated Information System—AIS Invalidates the Indicated Claims Under 35 U.S.C. § 102 (b), pp. 1-15, Nov. 15, 2005.
Exhibit 23 to the Supplemental Responses and Objections of ISS-GA and ISS-DE to SRI's Interrogatory Nos. 6 & 11, Comparison of Listed Publications to Claims-At-Issue of SRI's Patents-In-Suit for 35 U.S.C. § 103, pp. 1-127, Nov. 15, 2005.
Second Supplemental Responses and Objections of ISS-GA and ISS-DE to SRI's Interrogatory No. 11,*SRI International, Inc., a California Corporation v. Internet Security Systems, Inc., a Delaware Corporation, Internet Security Systems, Inc., a Georgia Corporation and Symantec Corporation a Delaware Corporation*, pp. 1-17, Certificate of Service dated Mar. 28, 2006.
Symantec Corporation's Fifth Supplemental Responses to SRI International, Inc.'s Interrogatory No. 11, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-15, dated Mar. 28, 2006.
SRI International Inc.'s Responses to Defendants ISS-GA's Second Set of Interogatories (Nos. 19-20) and SRI's Third Supplemental Response to ISS-GA's Interrogatory No. 17, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-54, Certificate of Service dated Dec. 15, 2005.
SRI International, Inc.'s Response to Symantec's Invalidity and Inequitable Conduct Contentions, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-50, Certificate of Service dated Dec. 15, 2005.
SRI International, Inc.'s Supplemental Response to Interrogatories No 12. and No. 15, *SRI International, Inc., a California Corporation v. Internet Security Systems, Inc. a Delaware Corporation, Internet Security Systems, Inc. a Georgia Corporation and Symantec Corporation a Delaware Corporation*, pp. 1-6, Certificate of Service date Dec. 15, 2005.
SRI International, Inc.'s "Amended" Response to Symantec's Invalidity and Inequitable Conduct Contentions, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-51, Certificate of Service date Dec. 16, 2005.
M. Siegl et al., Hierarchical Network Management—A Concept and its Prototype in SNMPv2, allegedly dated 1996.
RFC 1155, Structure and Identification of Management Information for TCP/IP-based Intranets, May 1990.
RFC 1157, A Simple Network Management Protocol (SNMP), May 1990.
RFC 1213, Management Information Base for Network Management of TCP/IP-based Internets: MIB-II, Mar. 1991.
RFC 1441, Introduction to Version 2 of the Internet-standard Network Management Framework, Apr. 1993.
RFC 1757, Remote Network Monitoring Management Information Base, Feb. 1995.
RFC 1271, Remote Network Monitoring Management Information Base, Nov. 1991.
RFC 1451, Manager-to-Manager Management Information Base, Apr. 1993.
Richard Heady et al., The Architecture of a Network Level Intrusion Detection System, Technical Report CS90-20, University of New Mexico, Department of Computer Science, Aug. 15, 1990.
ISS, RealSecure 1.0: User Guide and Reference Manual, 1996.
Karl Levitt and Christopher Wee (Eds.) Proceedings of Fourth Workshop on Future Directions in Computer Misuse and Anomaly Detection, Monterey, California, Nov. 12-14, 1996.
Haystack Labs, NetStalker, Installation and Users Guide, Version 1.0.2, 1996.
WheelGroup Corporation, NetRanger User Guide Version 1.3.1, 1997.
Netranger, Installation & Configuration Training, Slide Presentation, Apr. 1997.
WheelGroup Corp., Traditional Security Basics, Undated.
T.F. Lunt et al., A Real-time Intrusion Detection Expert System (IDES): Interim Progress Report Project 6784, SRI International, May 1990.
ISS, RealSecure web page, allegedly dated 1997.
ISS, Built-in Attack Recognition Capabilities Give Organizations Power to Detect and Respond to Attacks Before It's Too Late, Press release, May 12, 1997.
ISS, More About RealSecure: General Description and Comparison to Existing Systems, web page, allegedly available Jul. 21, 1997.
ISS, Frequently Asked Questions about RealSecure, web page, allegedly last updated May 30, 1997, and alleged available Jul. 21, 1997.
ISS,, Frequently Asked Questions about RealSecure, web page, allegedly last updated Oct. 21, 1997, and alleged available Jan. 20, 1998.
ISS, Frequently Asked Questions about RealSecure, web page, alleged available 1998.
ISS, Real-time Attack Recognition and Response: A Solution for Tightening Network Security, allegedly available Jan. 20, 1998.
ISS, Internet Security Systems Launches RealSecure 1.0 For Windows NT, Press release, May 12, 1997.
ISS, Internet Security Systems Augments Network Security with Real-time Attack Recognition and Response Tool, Press release, Dec. 9, 1996.
ISS, Internet Security Systems Ships RealSecure For Windows NT, Industry's First Real-time Attack Recognition and Response Tool for Windows NT, Press release, Aug. 19, 1997.
ISS, ISS Announces New Version of Leading Real-time Security Attack Recognition and Response Tool, Press release, Mar. 25, 1997.
Harris Corporation, Stake Out Network Surveillance, White Paper, 1996.
ISS, RealSecure Release Dates Table, Undated.
NFR, Frequently Asked Questions / Troubleshooting Guide, Undated.
Graph-based Intrusion Detection System (GRIDS) Home Page, webpage allegedly archived Jul. 19, 1997.
GrIDS Requirements Document, webpage allegedly archived Dec. 14, 1996.
GrIDS Outline Design Document, webpage allegedly archived Dec. 14, 1996.
Steven Cheung et al., The Design of GRIDS: A Graph-based Intrusion Detection System, Technical Report, UC Davis Department of Computer Science, May 14, 1997.
Steven Cheung et al., Graph-based Intrusion Detection System, Presentation at PI Meeting, Savannah, GA, Feb. 25-27, 1997.
WheelGroup Corp., NetRanger User's Guide 1.2.2, 1997.
R. Power et al., Detecting Network Intruders, Network Magazine, pp. 137-138, Oct. 1997.
P. Neumann, P. Porras and A. Valdes, Analysis and Response for Intrusion Detection in Large Networks, Summary for CMAD Workshop, Monterey, Nov. 12-14, 1996.
HP SNMP/XL User's Guide, HP 3000 MPE/iX Computer Systems Edition 5, Hewlett-Packard, Apr. 1994.
T. Lunt et al., A Real-time Intrusion Detection Expert System (IDES): Final Technical Report, Technical Report, SRI Computer Science Laboratory, Menlo Park, CA, Feb. 28, 1992.
T.F. Lunt et al., IDES: A Progress Report, Proc. 6th Annual Computer Security Applications Conference, pp. 273-285, 1990.

PC Week, NetRanger Keeps Watch Over Security Leaks, Sep. 1997.
Network Systems Corp., Data Privacy Facility Administrator's Guide Version 1.2, Sep. 1995.
3Com, HP Openview for Windows User Guide for Transcend Management Software, Version 6.1 for Windows and '97 for Windows NT, Oct. 1997.
3Com, HP Openview for Windows Workgroup Node Manager User Guide for Transcend Management Software, Version 6.0 for Windows, Jan. 1997.
Y. Frank Jou et al., Architecture Design of a Scalable Intrusion Detection System For the Emerging Network Infrastructure, Technical Report CDRL A005, DARPA Order E296, Department of Computer Science, North Carolina State University, Apr. 1997.
Y. Frank Jou and S. Felix Wu, Scalable Intrusion Detection for Emerging Network Infrastructures, IDS Program Review Presentation, SRI, Jul. 1997.
Shyhtsun F. Wu et al., Intrusion Detection for Link-state Routing Protocols, Dec. 2, 1996.
Diheng Qu et al., Statistical Anomaly Detection for Link-state Routing Protocols, 6th International Conference on Network Protocol (ICNP '98), pp. 62-70, Oct. 1998.
WheelGroup Corp., NetRanger User's Guide, 1996.
WheelGroup Corp., NetRanger User's Guide 1.2, 1997.
P.Porras and P. Neumann, EMERALD: Event Monitoring Enabling Responses to Anomalous Live Disturbances Conceptual Overview, Dec. 18, 1996.
WheelGroup Corp, WheelGroup Press Release Summary, undated.
WheelGroup Corp., WheelGroup Releases NetRanger 2.0, Press Release, Aug. 25, 1997.
WheelGroup Corp., Summary of DoD/SPOCK Evaluation of WheelGroup's NetRanger Intrusion Detection System, Press Release, Jul. 8, 1997.
NFR Beta Handbook, Nov. 1997.
Harris Corporation Web Site allegedly obtained from archive.org.
Roy Maxion et al., A Case Study of Ethernet Anomalies in a Distributed Computing Environment, IEEE Transactions on Reliability, 39(4), pp. 433-443, Oct. 1990.
NetRanger SQL Queries, allegedly dated May 28, 1997.
Frank Feather et al., Fault Detection in an Ethernet Network Using Anomaly Signature Matching, Computer Communication Review, SIGCOMM'93 Conference Proceedings, pp. 279-288, Sep. 13-17, 1992.
NFR Version 2.0 Library, Oct. 5, 1998.
NFR Version 2.0 Getting Started Guide, undated.
NFR Version 2.0 User's Guide, undated.
NFR Version 2.0 Advanced User's Guide, undated.
NFR Version 2.0 Glossary, undated.
Haystack Labs, NetStalker for Network Systems Corporation, web page, allegedly dated 1996.
Haystack Labs, Network Systems and Haystack Labs introduce NetStalker to Track Hacker Attempts, Press Release, Nov. 10, 1995.
C. Schuba, On the Modeling, Design and Implementation of Firewall Technology, Ph.D. Thesis, Purdue University, Dec. 1997.
NFR User Guide, Version 1.1, Nov. 1997.
L. Todd Heberlein, Network Security Monitor Final Report, allegedly dated Feb. 1995.
Steven R. Snapp et al., The DIDS (Distributed Intrusion Detection System) Prototype, Proc. Summer 1992 USENIX Conference, Jun. 8-12, 1992.
RealSecure 1.2.2: User Guide and Reference Manual, Sep. 11, 1997.
RFC 2021, Remote Network Monitoring Management Information Base Version 2 using SMI v2, Jan. 1997.
Declaration of L. Todd Heberlein.
Declaration of Frederick Avolio.
Declaration of Lynn Berard.
Plaintiff SRI's Responses to Defendant Symantec's Third Set of Requests for Admission.
Plaintiff SRI's Responses to Defendant ISS's First Set of Requests for Admission.
Deposition Testimony of Frank Jou, Jan. 27, 2006.
Deposition Testimony of George Kesidis, May 25, 2006.
Deposition Testimony of George Kesidis, May 26, 2006.
Frank Feather, Fault Detection in an Ethernet Network via Anomaly Detectors, Ph.D. Thesis, Carnegie Mellon University, Order No. 9224199, 1992.
Archived Pages from the Haystack Website.
Peter G. Neumann and Alfonso Valdes, Analysis and Response for Intrusion Detection in Large Networks, Summary for Intrusion Detection Workshop, Santa Cruz, CA, Aug. 26-28, 1996.
Order Granting In Part and Denying In Part DI 286 MSJ Re: Non-Infringement DI 291 MSJ, issued by United States District Court for the District of Delaware, *SRI International, Inc. v. Internet Security Systems, Inc.*, Civ No. 04-1199-SLR, Oct. 17, 2006, copy consists of 1 unnumbered page.
Order Denying DI 270 MPSJ finding as Moot DI 276 and 279, issued by United States District Court for the District of Delaware, *SRI International, Inc. v. Internet Security Systems, Inc.*, Civ No. 04-1199-SLR, Oct. 17, 2006, copy consists of 2 unnumbered pages.
Memorandum Order Re: Disputed Claim Language, issued by United States District Court for the District of Delaware, *SRI International, Inc. v. Internet Security Systems, Inc.*, Civ No. 04-1199-SLR, Oct. 17, 2006, pp. 1-8.
Memorandum Opinion issued by United States District Court for the District of Delaware, *SRI International, Inc. v. Internet Security Systems, Inc.*, Civ No. 04-1199-SLR, Oct. 17, 2006, copy consists of 17 pages.
Memorandum Opinion issued by United States District Court for the District of Delaware, *SRI International, Inc. v. Internet Security Systems, Inc.*, Civ No. 04-1199-SLR, Oct. 17, 2006, copy consists of 27 pages.
CheckPoint Software Technologies, Ltd., "Getting Started with Check Point RealSecure", Jan. 2000, pp. 1-17.
CheckPoint Software Technologies, Ltd., "Check Point RealSecure Network Engine User Guide", Jan. 2000.
Elson, David, "Intrusion Detection, Theory and Practice", Mar. 2000, <http://online.securityfocus.com/infocus/1203>.
ICSAlabs, "Intrusion Detection System Buyer's Guide", Dec. 1999.
RFC 2328, OSPF Version 2, Apr. 1998.
Declaration of Daniel Teal.
Deposition Testimony of George Kesidis, May 29, 2006.
Microsoft Press Computer Dictionary, 3rd Ed., 1997.
SRI's Opening Brief in Support of its Motion for Partial Summary Judgment of No Anticipation by the "EMERALD 1997" Publication, in the United States District Court for the District of Delaware, *SRI International, Inc. v. Internet Security Systems, Inc. and Symantec Corporation* (C.A. No. 04-1199 (SLR)), Jun. 16, 2006.
Defendant's Joint Opposition to SRI International, Inc.'s Motion for Partial Summary Judgment of No Anticipation by the "EMERALD 1997" Publication, In the United States District Court for the District of Delaware, *SRI International, Inc. v. Internet Security Systems, Inc. and Symantec Corporation* (C.A. No. 04-1199 (SLR)), Jun. 30, 2006.
SRI International, Inc.'s Reply in Support of its Motion for Partial Summary Judgment of No Anticipation by the "EMERALD 1997" Publication, In the United States District Court for the District Of Delaware, *SRI International, Inc. v. Internet Security Systems, Inc. and Symantec Corporation* (C.A. No. 04-1199 (SLR)), Jul. 10, 2006.
SRI International, Inc.'s Opening Brief in Support of its Motion for Partial Summary Judgment That the Live Traffic Article is not a Section 102(b) Printed Publication, In the United States District Court for the District of Delaware, *SRI International, Inc. v. Internet Security Systems, Inc. and Symantec Corporation* (C.A. No. 04-1199 (SLR)), Jun. 16, 2006.
Answering Brief of Defendants ISS and Symantec to SRI's Motion for Partial Summary Judgment That the Live Traffic Article is Not a Section 102(b) Printed Publication, In the United States District Court for the District of Delaware, *SRI International, Inc. v. Internet Security Systems, Inc. and Symantec Corporation* (C.A. No. 04-1199 (SLR)), Jun. 30, 2006.
SRI International, Inc.'s Reply in Support of its Motion for Partial Summary Judgment That the Live Traffic Article is not a Section 102(b) Printed Publication, In the United States District Court for the District of Delaware, *SRI International, Inc. v. Internet Security Systems, Inc. and Symantec Corporation* (C.A. No. 04-1199 (SLR)). Jul. 10, 2006.

ISS's Opening Brief in Support of Their Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc. v. Internet Security Systems, Inc. and Symantec Corporation* (C.A. No. 04-1199 (SLR)), Jun. 30, 2006.

SRI International, Inc.'s Opposition to ISS's Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc. v. Internet Security Systems, Inc. and Symantec Corporation* (C.A. No. 04-1199 (SLR)), Jul. 17, 2006.

ISS's Reply Brief in Support of its Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc. v. Internet Security Systems, Inc. and Symantec Corporation* (C.A. No. 04-1199 (SLR)), Jul. 24, 2006.

Opening Brief in Support of Joint Motion for Summary Judgment of Invalidity Pursuant to 35 U.S.C 102 & 103 Of Defendants ISS and Symantec, In the United States District Court for the District of Delaware, *SRI International, Inc. v. Internet Security Systems, Inc. and Symantec Corporation* (C.A. No. 04-1199 (SLR)), Jun. 16, 2006.

SRI International Inc.'s Response to Defendant's Joint Motion for Summary Judgment of Invalidity Pursuant to 35 U.S.C. 102 & 103, In the United States District Court for the District of Delaware, *SRI International, Inc. v. Internet Security Systems, Inc. and Symantec Corporation* (C.A. No. 04-1199 (SLR)), Jun. 30, 2006.

Defendants' Joint Reply Brief in Support of Their Motion for Summary Judgment of Invalidity Pursuant to 35 U.S.C. 102 & 103, In the United States District Court for the District of Delaware, *SRI International, Inc. v. Internet Security Systems, Inc. and Symantec Corporation* (C.A. No. 04-1199 (SLR)), Jul. 19, 2006.

Rebuttal Report of Dr. George Kesidis on Validity, In the United States District Court for the District Of Delaware, *SRI International, Inc. v. Internet Security Systems, Inc. and Symantec Corporation* (C.A. No. 04-1199 (SLR)), May 16, 2006.

SRI International, Inc.'s Responses to Defendant ISS-GA's Second Set of Interrogatories [Nos. 19-20] and SRI's Third Supplemental Response to ISS-GA's Interrogatory No. 17, In the United States District Court for the District of Delaware, *SRI International, Inc. v. Internet Security Systems, Inc. and Symantec Corporation* (C.A. No. 04-1199 (SLR)), Dec. 15, 2005.

SRI International, Inc.'s Supplemental Response to Interrogatories No. 12 and No. 15, In the United States District Court for the District of Delaware, *SRI International, Inc. v. Internet Security Systems, Inc. and Symantec Corporation* (C.A. No. 04-1199 (SLR)), Dec. 15, 2005.

SRI International Inc.'s Opening Brief in Support of its Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jun. 16, 2006.

Defendant's Joint Opposition to SRI International Inc.'s Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jun. 30, 2006.

SRI International Inc.'s Reply in Support of its Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jul. 10, 2006.

Declaration of Phillip A. Porras, Jul. 30, 2006.

Declaration of Kyle Wagner Compton, Jul. 30, 2006.

Deposition of Stephen G. Kunin, Jun. 9, 2006.

Opening Brief for Plaintiff-Appellant, United States Court of Appeals for the Federal Circuit, *SRI International, Inc. v. Internet Security Systems, Inc. and Symantec Corporation* (2007-1065), Jan. 23, 2007.

Brief for Defendants-Appellees, United States Court of Appeals for the Federal Circuit, *SRI International, Inc. v. Internet Security Systems, Inc. and Symantec Corporation* (2007-1065), Mar. 12, 2007.

Opinion, United States Court of Appeals for the Federal Circuit, *SRI International, Inc. v. Internet Security Systems, Inc. and Symantec Corporation* (2007-1065), Jan. 8, 2008.

Defendants-Appellees' Combined Petition for Panel Rehearing and Rehearing En Banc, United States Court of Appeals for the Federal Circuit, *SRI International, Inc. v. Internet Security Systems, Inc. and Symantec Corporation* (2007-1065), Jan. 22, 2008.

Plaintiff-Appelant SRI International, Inc.'s Response to Petition for Panel Rehearling and Rehearing En Banc, United States Court of Appeals for the Federal Circuit, Case 04-CV-1199, *SRI International, Inc. v. Internet Security Systems (Delaware), Internet Security Systems, Inc. (Georgia), and Symantec Corporation*, Feb. 8, 2008.

Mark Miller, Managing Internetworks with SNMP, 2nd Edition, 1997.

NFR Version 1.0beta2 Source Code.

Sun Microsystems, "SunScreen EFS Configuration and Management Guide, Release 1.1, Rev. A" (Jun. 1997).

D. Perkins, E. McGinnis, "Understanding SNMP MIBs" (1997).

W. Stallings, "SNMP, SNMPv2 and CMIP, The Practical Guide to Network-Management Standards" (1993).

S. Garfinkel and G. Spafford, "Practical UNIX & Internet Security", 2nd Edition (O'Reilly and Assoc., 1996).

D.B. Chapman, E. Zwicky, "Building Internet Firewalls", 1st Edition (O'Reilly & Assoc., 1995).

Declaration of Jeffery Hansen, Ph.D.

Declaration of Paul Hickman of the Internet Archive.

W. Stallings, "SNMP, SNMPv2, SNMPv3 and RMON 1 and 2", 3rd ed., 1999.

R. Bace, "Intrusion Detection" (Macmillan Technical Publishing 2000).

S.S. Chen et al, GrIDS—A Graph Based Intrusion Detection System for Large Networks, 19th National Information Security Systems Conference, 1996.

L.T. Heberlein, et al., Internetwork Security Monitor, Proc. 15th National Computer Security Conference, Oct. 13-16, 1992, pp. 262-271.

B. Mukherjee et al., Network Intrusion Detection, IEEE Network 8(3), pp. 26-41, May/Jun. 1994.

B. Gleichauf and D. Teal, NetRanger High-level Overview Version 1.1, WheelGroup Corp., Nov. 1996.

S.R. Snapp, et al., A System for Distributed Intrusion Detection, COMPCON Spring'91, Digest of Papers, San Francisco, CA, Feb. 25-Mar. 1, 1991, pp. 170-176.

James Brentano et al., An Architecture for a Distributed Intrusion Detection System, Proc. 14th Department of Energy Computer Security Group Conference, May 7-9, 1991, pp. 17.25-17.45.

L.T. Heberlein et al., Towards Detecting Intrusions in a Networked Environment, Proc. 14th Department of Energy Computer Security Group Conference, pp. 17.47-17.65, May 7-9, 1991.

L.T. Heberlein, Towards Detecting Intrusions in a Networked Environment, Technical Report CSE-91-23, Division of Computer Science, UC Davis, Jun. 1991.

L.T. Heberlein et al., A Method to Detect Intrusive Activity in a Networked Environment, Proc. 14th National Computer Security Conference, pp. 362-371, Oct. 1991.

Ranum et al., Implementing a Generalized Tool for Network Monitoring, Proc. 11$^{th}$ Systems Administration Conference (LISA'97), San Diego, CA, Oct. 1997.

Steven Snapp et al., Intrusion Detection Systems (IDS): A Survey of Existing Systems and a Proposed Distributed IDS Architecture, CSE-91-7, allegedly dated Feb. 1991.

L.T. Heberlein et al., Network Attacks and an Ethernet-based Network Security Monitor, Proc. 13th Department of Energy Computer Security Group Conference, pp. 14.1-14.13, May 8-10, 1990.

RealSecure 1.1: User Guide and Reference Manual, 1997.

RealSecure 1.2: User Guide and Reference Manual 1997.

Order Granting Request for Ex Parte Reexamination for U.S. Appl. No. 90/009,125, Jul. 19, 2008, copy consists of 18 pages.

Order Granting Request for Ex Parte Reexamination for U.S. Appl. No. 90/009,127, Jul. 19, 2008, copy consists of 22 pages.

Office Action in Ex Parte Reexamination for U.S. Appl. No. 90/008,123, Mar. 28, 2008, copy consists of 14 pages.

Response to Office Action of Mar. 28, 2008 for U.S. Appl. No. 90/008,123, May 28, 2008, pp. 1-20.
Final Office Action in Ex Parte Reexamination for U.S. Appl. No, 09/008,123, Sep. 5, 2008, copy consists of 21 pages.
Office Action in Ex Parte Reexamination for U.S. Appl. No. 90/008,125, Jan. 18, 2008, copy consists of 11 pages.
Response to Office Action of Jan. 18, 2008 for U.S. Appl. No. 90/008,125, Mar. 18, 2008, pp. 1-15.
Office Action in Ex Parte Reexamination for U.S. Appl. No. 90/008,113, Jan. 18, 2008, copy consists of 12 pages.
Response to Office Action of Jan. 18, 2008 for U.S. Appl. No. 90/008,113, Mar. 18, 2008, pp. 1-30.
Office Action in Ex Parte Reexamination for U.S. Appl. No. 90/008,098, Jan. 18, 2008, copy consists of 14 pages.

* cited by examiner

_80_

| TYPE OF ATTACK | —PRIORITY— | | |
|---|---|---|---|
| | DENIAL OF SERVICE (88) | INTEGRITY (90) | SECURITY (92) |
| 82 "PING OF DEATH" | 90 | 10 | 10 |
| 84 BUFFER OVERFLOW | 80 | 90 | 90 |
| 86 WRITE-POLLING VIOLATION | 10 | 90 | 70 |
| 94 USER1 | 0 | 20 | 80 |
| 96 USER2 | 80 | 10 | 10 |

FIG. 3

NETWORK-BASED ALERT MANAGEMENT SYSTEM

CLAIM OF PRIORITY

This application is a Continuation of U.S. patent application Ser. No. 09/626,547, filed on Jul. 25, 2000, now U.S. Pat. No. 6,704,847 and is a Continuation-in-Part of U.S. patent application Ser. No. 09/188,739, filed on Nov. 9, 1998, now U.S. Pat. No. 6,321,338. U.S. patent application Ser. No. 09/626,547, filed on Jul. 25, 2000, now U.S. Pat. No. 6,704,847 is a Continuation-in-Part of U.S. patent application Ser. No. 09/188,739, filed on Nov. 9, 1998, now U.S. Pat. No. 6,321,338.

FEDERALLY SPONSORED RESEARCH OR DEVELOPMENT

This invention was made with Government support under Contract Number F30602-96-C-0294 and F30602-96-C-0187 awarded by DARPA and the Air Force Research Laboratory. The Government has certain rights in this invention.

An exemplary computer program listing appendix is provided on a compact disc, in a file named "3928_3_appendix.doc". The size of 3928_3_appendix.doc is 146,944 bytes (147,456 bytes on a disc), and the file was created on Sep. 2, 2004. The content of 3928_3_appendix.doc is herein incorporated by reference in its entirety.

TECHNICAL FIELD

This invention relates to network-based alert management.

BACKGROUND

Computer networks may include one or more digital security monitors or sensors that automatically analyze traffic on the network to identify potentially suspicious activity. The sensors may be implemented in either software or hardware. Monitors may focus on security monitoring and/or on fault analysis.

Upon detecting suspicious activity, the sensors typically generate some kind of digital alert message or signal, and attempt to bring that message to the attention of network I/S managers whose responsibility it is to respond and react in an appropriate defensive manner against hostile digital attacks or to recover quickly from catastrophic failures.

SUMMARY

In an aspect, the invention features a system for managing network alerts including data connections adapted to receive alerts from network sensors, alert processing logic coupled to the data connections and further including alert integration logic operable to integrate the alerts, report generation logic coupled to the alert integration logic, distribution logic coupled to the report generation logic and a remote management unit coupled to the alert processing logic and being operable to dynamically modify the alert processing logic. The data connections may include secure electronic communication lines and be dynamically configurable through the remote management unit. The network sensors may include heterogeneous sensors.

In another aspect, the invention features a method of managing alerts including receiving alerts from a number of network sensors, filtering the alerts to produce one or more internal reports and consolidating the internal reports that are indicative of a common incident-to-incident report. Related incident reports may be correlated. The network sensors may format the received alerts. Filtering includes deleting alerts that do not match specified rules. The filtering rules may be dynamically adjusted. Filtering may also include tagging alerts with a significance score that can indicate a priority measure and relevance measure.

Among the advantages of the invention may be one or more of the following.

The alert manager can be tailored to a particular application by dynamically adding or removing data connections to sources of incoming alerts, and by dynamically varying the process modules, user filter clauses, priority clauses, topology clauses, and output. Process modules may be added, modified, and deleted while the alert manager is active. Output may be configured for a variety of graphical user interfaces (GUIs). In embodiments, useful, for example, for each category of attack the user can define different priorities as related to denial of service, security, and integrity.

Process modules are logical entities within the alert manager that can respond to an incoming alert in real time and virtual time, i.e., data within an application can cause the alert manager to respond.

The alert manager can act as a sender or receiver. In embodiments, useful, for example, the alert manager can listen to a specific port in a network or connect to an external process on a host computer and process its data.

The alert management process can be an interpretive process allowing the incorporation of new process clauses and new rules.

The alert management process may provide a full solution for managing a diverse suite of multiparty security and fault monitoring services. Example targets of the alert management process are heterogeneous network computing environments that are subject to some perceived operational requirements for confidentiality, integrity, or availability. Inserted within the network are a suite of potential multiparty security and fault monitoring services such as intrusion detection systems, firewalls, security scanners, virus protection software, network management probes, load balancers, or network service appliances. The alert management process provides alert distributions within the monitored network through which security alerts, fault reports, and performance logs may be collected, processed and distributed to remote processing stations (e.g., Security Data Centers, Administrative Help Desks, MIS stations). Combined data produced by the security, fault, or performance monitoring services provide these remote processing stations detailed insight into the security posture, and more broadly the overall health, of the monitored network.

Value may be added to the content delivered by the alert management process to the remote processing station(s) that subscribe to alerts in the form of an advanced alert processing chain. For example, alerts received by the alert management process and prepared for forwarding to a remote processing station, may be filtered using a dynamically down-loadable message criteria specification.

In a further aspect, alerts may be tagged with a priority indication flag formulated against the remote processing station's alert processing policy and tagged with a relevance flag that indicates the likely severity of the attack with respect to the known internal topology of the monitored network.

In a further aspect of the invention, alerts may be aggregated (or consolidated) into single incident reports when found to be associated with a series of equivalent alerts produced by the same sensor or by other sensors, based upon equivalence criteria, and the incident reports forwarded to the remote processing station.

The alert management system is configurable with respect to the data needs and policies specified by the remote processing station. These processes are customizable on a per remote processing station basis. For example, two remote processing stations may in parallel subscribe to alerts from the alert management process, with each having individual filtering policies, prioritization schemes, and so forth, applied to the alert/incident reports it receives.

Other features and advantages will become apparent from the following description and from the claims.

DESCRIPTION OF DRAWINGS

FIG. 3 is a block diagram of a priority database record.

DETAILED DESCRIPTION

Figure 1:
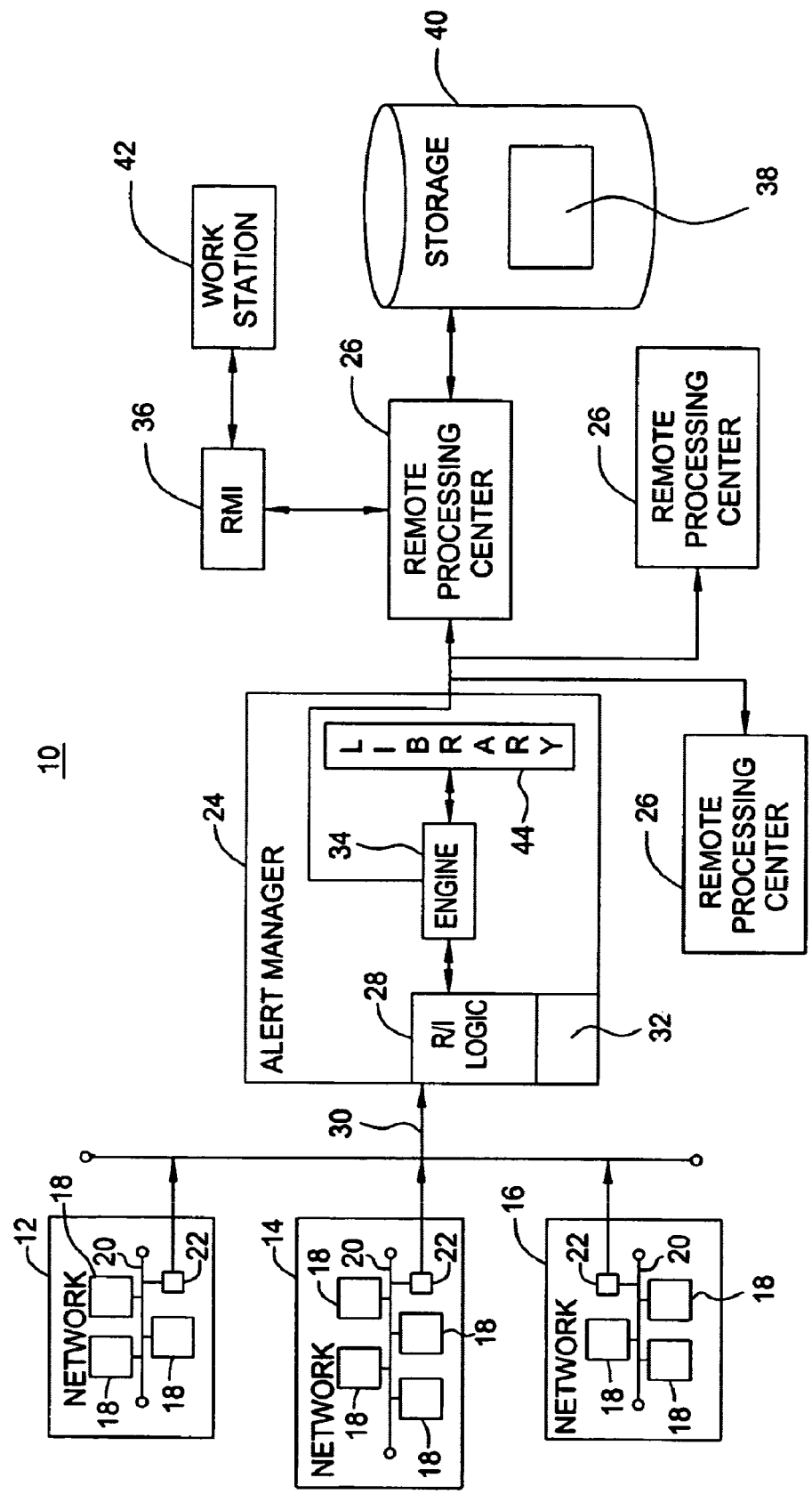
FIG. 1 is a block diagram of a network based alert management system.

Referring to FIG. 1, a network based alert management system 10 includes a network 12, a network 14, and a network 16. Each of the networks 12-14 includes a number of computer systems collectively labeled 18, interconnected, for example, by an Ethernet cable 20. Each of the networks 12-14 includes security and fault monitoring systems generally labeled 22. Each security and fault monitoring system 22 is linked to an alert manager 24. The alert manager 24 is linked to one or more remote processing centers generally labeled 26. Each alert processing center 26 includes a remote management interface 36 (shown on only one center 26 by way of example). The remote management interface 36 provides a user (not shown) the capability of configuring reports produced by the alert manager 24.

The security and fault monitoring systems 22 may include, for example, intrusion detection systems, firewalls, security scanners, virus protection software, network management probes, load balancers, and network service appliances. Each of the security and fault monitoring systems 22 produces an alert stream in the form of, for example, security alerts, fault reports, and performance logs. The alert stream is sent to the alert manager 24 for collection, processing, and distribution to the remote processing center 26. Example remote processing centers 26 are security data centers, administrative help desks, and MIS stations.

In an embodiment, the remote processing center 26 subscribes to the alert manager 24 which in turns distributes specific collected and processed alert information to the remote processing center 26, more fully described below.

The networks 12, 14, and 16 being monitored by the security and fault monitoring systems 22 may include any computer network environment and topology such as local area networks (LAN), wide area networks (WAN), Ethernet, switched, and TCP/IP-based network environments. Network services occurring within the networks 12-16 include features common to many network operating systems such as mail, HTTP, ftp, remote log in, network file systems, finger, Kerbebos, and SNMP. Each of the sensors 22 monitors various host and/or network activity within the networks 12-16, and each sensor 22, as discussed above, generate a stream of alerts, triggered by potentially suspicious events, such as network packet data transfer commands, data transfer errors, network packet data transfer volume, and so forth. The alerts indicate a suspicion of possible malicious intrusion or other threat to operations within the networks 12-16.

The alert manager 24 includes a receive-input logic module 28. In an embodiment, the receive-input logic 28 of the alert manager 24 subscribes, i.e., establishes a transport connection, to receive each of the alert streams produced by the sensors 22 through a secure electronic communication line (SSL) 30. The alert streams contain raw, i.e., unprocessed, alerts. The monitors 22 may format their respective alert streams in a variety of formats, such as IDIP, SNMP, HP Openview, an XML-based standard format (such as the Attack Specifications from IETF), Common Intrusion Detection Framework (CIDF), GIDOs, or some other format. The receive-input logic 28 of the alert manager 24 is equipped with translation modules 32 to translate the original, raw alert streams from the monitors 22 into a common format for further processing, if the alerts do not arrive in the common format.

In another embodiment, the monitors 22 include conversion software (not shown), also referred to as "wrapper" software that translates a monitor's raw alert stream into the common format used by the alert manager 24. The wrapper software can add data items of interest to the alert manager 24, by querying its network 12-16.

In another embodiment, a combination of monitors 22 having wrapper software and the receive-input logic 28 pre-processing raw alerts in the alert management network 10 are present to accommodate a heterogeneous base of monitors 22 that an end-user desires to manage.

The alert manager 24 includes an alert processing engine 34. Raw alerts received by the receive-input module 28 and formatted into the common format are sent to the alert processing engine 34.

Figure 2:
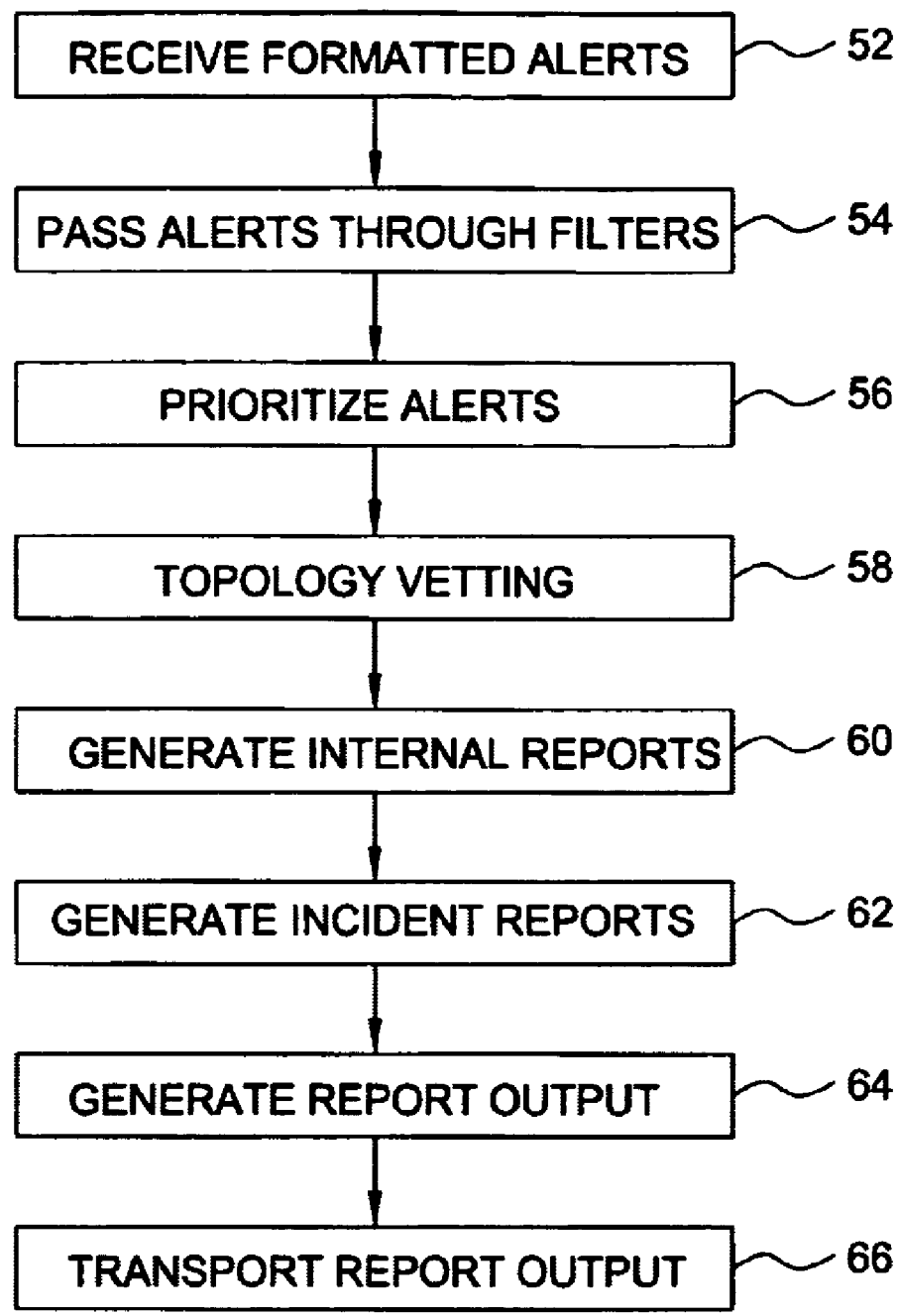
FIG. 2 is a flow diagram of an alert management process.

Referring to FIG. 2, an alert management process 50 residing in the alert processing engine 34 includes receiving 52 formatted alerts from the receive-input logic 28. The formatted alerts are passed 54 through user-specified filters and alerts not matching criteria of the user-specified filters are discarded.

For example, a particular end-user subscriber may be responsible only for a portion of the overall operations network and may only wish to see alerts coming from a particular subset of monitors 22, e.g., from particular ports. Each end-user subscriber can interactively define his or her own customized user-specified filters using the remote management interface 36 of the remote processing center 26, fully described below.

The filtered alerts are prioritized 56, i.e., rated or scored according to priorities dynamically controlled by the user. In an embodiment, the priority of an alert is determined by analyzing the known, (relative) potential impact of the attack category identified with respect to each of various concerns such as confidentiality, data integrity, and system availability. Confidentiality involves allowing only authorized users to view network data. Data integrity involves allowing only authorized persons to change data. System availability involves providing users access to data whenever needed with minimum downtime.

Different categories of known computer intrusions and anomalies generally pose threats with differing levels of impact on each of the above three concerns. In addition, for different users and different applications, each of the concerns may be of different relative priority. For example, in a general Internet news/search portal like Yahoo! or Lycos, continuous availability may be a more important concern than confidentiality. Conversely, for a government intelligence database, confidentiality may be a greater priority than continuous availability. For an e-commerce business site, all three concerns may be of roughly equal seriousness and priority. An ultimate priority score assigned to a particular alert for a given end-user during prioritization 56 reflects a sum or combination of the identified attack's potential adverse impact along each of the dimensions of interest (confidentiality, data integrity, and system availability), weighted by the end-user's individual profile of relative priority for each such dimension.

In an embodiment, a default priority profile is provided for each user or subscriber that assigns equal priority to confidentiality, data integrity, and system availability. In a preferred embodiment, the end-user may configure the priorities dynamically, and modify the default values as desired, through the remote management interface 36 that gives the user the flexibility to customize priority assignments in a manner that reflects his/her unique concerns.

In an another embodiment, users (or system developers) directly assign a relative priority score to each type of attack, instead of ranking more abstract properties such as integrity or availability, that allows more precise reflection of a user's priorities regarding specific attacks, but requires more initial entry of detailed information.

In an embodiment, users may register a listing of critical services, identified by <host ID, protocol> pairs, as to whom potential attacks or operational failures are considered to be of especially high priority.

Management and alteration of filters and listings of critical services in accordance with each of the prioritization methodologies described above can are performed dynamically and interactively while alert manager 24 is in operation and as user priorities change using the remote management interface 36.

The alerts are topology vetted 58. Vetting 58 provides a relevance rating to alerts based on the topological vulnerability of the network being monitored to the type of attack signaled by the alert. Example topologies include the computing environment, what kind of operating system (O/S), network infrastructure, and so forth. In a preferred embodiment, vetting 58 utilizes a mapping between each network host and an enumeration of that host's O/S and O/S version(s). Vetting step 58 further preferably utilizes a topology relevance table indicating the relevance of various types of attacks to each of the different possible OS/version environments. Thus, to determine and assign a relevance score for a particular alert, the host ID (hostname/IP address) for the target of that alert can be used to retrieve its OS/version information, and the OS/version along with the attack type of the alert can be used to retrieve a relevancy score from the topology table.

In an embodiment, the topology table of the network being monitored is dynamically configurable by end users through the remote management interface 36.

In another embodiment, automatic local area network (LAN) mapping is provided by a network topology scope application.

The relevance of various types of known attacks against different topologies is preferably specified in predefined maps, but dynamically configured using the remote management interface 36.

Internal reports are generated 60 from the output of filtering 54, prioritizing 56 and vetting 58. Internal reports generally include fewer alerts as compared with the original raw alert stream, as a result of the user-configured filtering 40. Internal reports also tag or associate each alert with priority and/or relevance scores as a result of priority mapping 56 and topology vetting 58, respectively.

The internal reports are used to generate 62 consolidated incident reports. A consolidated incident report adds perspective and reduces information clutter by merging/combining the internal reports for multiple alerts into a single incident report. In a preferred embodiment, generating 62 is carried out through report aggregation and equivalence recognition. Aggregation refers to combining alerts produced by a single sensor, whereas equivalence recognition refers to combining alerts from multiple sensors. The underlying notion in both cases is that nominally different alerts may actually represent a single intrusion "incident" in the real world. By analogy, a single criminal intrusion into a physical property might trigger alarms on multiple sensors such as a door alarm and a motion detector that are instrumented on the same premises, but from an informational perspective both alarms are essentially signaling the same event.

In an embodiment, alert parameters examined for report aggregation include a variable combination of attack type, timestamp, monitor identification (ID), user ID, process ID, and <IP, port addresses> for the source and target of the suspicious activity.

When an internal report is generated 60 alerts are consolidated and the corresponding priority and relevance tags for the individual alerts are merged into single meta-priority/meta-relevance scores for the single incident. Different functions may be utilized for doing the priority blend, such as additive, min/max, average, and so forth. Duration of the overall incident is also preferably computed and associated with the incident, based on the time stamps of the various individual alerts involving the incident.

The consolidated incident reports are used to generate 64 a report output. Formatting of the output report is based on subscriber-customized criteria that are defined using the remote management interface 36. The report output is transported 66 to the remote processing center 26.

Selection of a transport is under user control and managed using the remote management interface 36. The user may specify, for example, E-mail, XML, HTML and/or writing out to a file. In an embodiment, the transport occurs over an SSL for display and assessment by the end-user.

The filtering 54, prioritization 54 and topology vetting 58 are event driven, i.e., each alert is processed and filtered/tagged as it arrives, one alert at a time. However, temporal clauses are utilized for aspects of report aggregation and equivalence recognition among multiple alerts. For example, as internal reports are generated 60 a sliding window is established during which additional records may be merged into the aggregate incident report. A single-alert internal report may be sent to the remote processing center 26 indicating that it has witnessed the alert. A subsequent aggregate alert report, i.e., an incident report, covering that single alert as well as others, may also be forwarded to the remote processing center 26 to indicate a duration of the attack/incident, an aggregate count of individual alerts representing this incident, and an aggregate priority. In an embodiment, aggregate alert flushing may occur after some period of inactivity (e.g., "two minutes since last event"). The aggregate alert flushing is not event driven, but rather driven by an internal timeout recognized from a system clock (not shown) of the alert manager 24.

Referring to FIG. 3, an exemplary priority database record 80 used for prioritization 56 of filtered alerts includes example network attacks ping of death 82, buffer overflow 84 and write polling violation 86. For each of the attacks 82-86, a relative priority rating is assigned, namely, denial of service (system availability) 88, data integrity 90, and security (confidentiality) 92. By way of example, a first end-user 94 weights denial of service at 0%, data integrity at 20%, and security at 80%. A second end-user 96 weights denial of service at 80%, data integrity at 10% and security at 10%. Thus, for the priority database record 80, the user 94 emphasizes a high concern (priority) with security, while the user 96 emphasizes a high concern (priority) with denial of service.

In this example, for first user 94 a "ping of death" alert 82 will have a priority score=(0*90)+(0.2*10)+(0.8*10)=10; whereas for second user 96 a "ping of death" alert 82 will receive a priority score=(0.8*90)+(0.1*10)+(0.1*10)=74.

As is seen from the description above, (a) it is the relative value of these priority scores that has significance, not the absolute magnitudes, and (b) the priority values for alerts and for user preferences are subjective values that may vary from one application to another and from one user to another. As noted above, the alert priority map values and user priority profiles may be dynamically adjusted and customized by individual users via remote management interface 36.

Referring again to FIG. 1, the report output of the alert processing process 50 is stored at the remote processing center 26 in a database 38 contained in a storage device 40 for retrieval and reporting by the end user. In an embodiment, the report output is translated at the remote processing center 26 in accordance with a user-configurable database schema into an existing/legacy database management system (not shown) contained in the remote processing center 26 for convenience of the end-user, either manually by a database integration team or automatically using a database mediator/translator. The remote management interface 36 accesses the database management system and presents the report output to the end-user, such as by a graphical user interface (GUI) on a workstation 42.

In an embodiment, the alert management network 10 provides an open, dynamic infrastructure for alert processing and management. The alert manager 24 preferably includes functionality for dynamically generating, suspending, and configuring data connections and logical process modules, in response to interactive remote user commands issued via remote management interface 36. The remote management interface 36 preferably executes a java application that generates command files, in response to end user requests, in the form of directives and any necessary data files, such as the priority database record 80, and so forth. The java application communicates, e.g. via telnet, to the alert manager 24 and downloads the directives and data files. The alert processing engine 34, preferably a postscript interpreter in one embodiment, can process the directives dynamically. Many of the directives are preferably defined in terms of postscript code that resides locally in a library 44 in the alert manager 24. Applications running in alert manager 24 are written in modular fashion, allowing directives to accomplish meaningful change of logical behavior by instructing the alert manager 24 to terminate a particular process clause and activate a newly downloaded clause, for example.

By way of another example, through the operation of the alert processing engine 34 the alert manager 24 can dynamically establish and suspend connections to the various alert streams generated by the security and fault monitoring systems 22. Thus, the alert manager 24 can dynamically "plug into" (i.e., connect) new alert streams, such as alert streams from additional sensors newly deployed by an end-user, and likewise can dynamically suspend (permanently or temporarily) its connection to alert streams from sensors 22 that are removed, replaced, taken offline, and so forth. Similarly, alert manager 24 can dynamically generate or suspend modules of the alert management process 50, and can dynamically adjust the configurable parameter settings of those modules.

In this manner, alert manager 24 is designed to be responsive to dynamic configuration requests initiated by end users using the remote management interface 36 of the remote processing center 26. As mentioned above, the remote management interface 36 provides an interactive interface at workstation 42 for end-users to specify desired modifications to the dynamically configurable aspects of alert manager 24.

Figure 4:
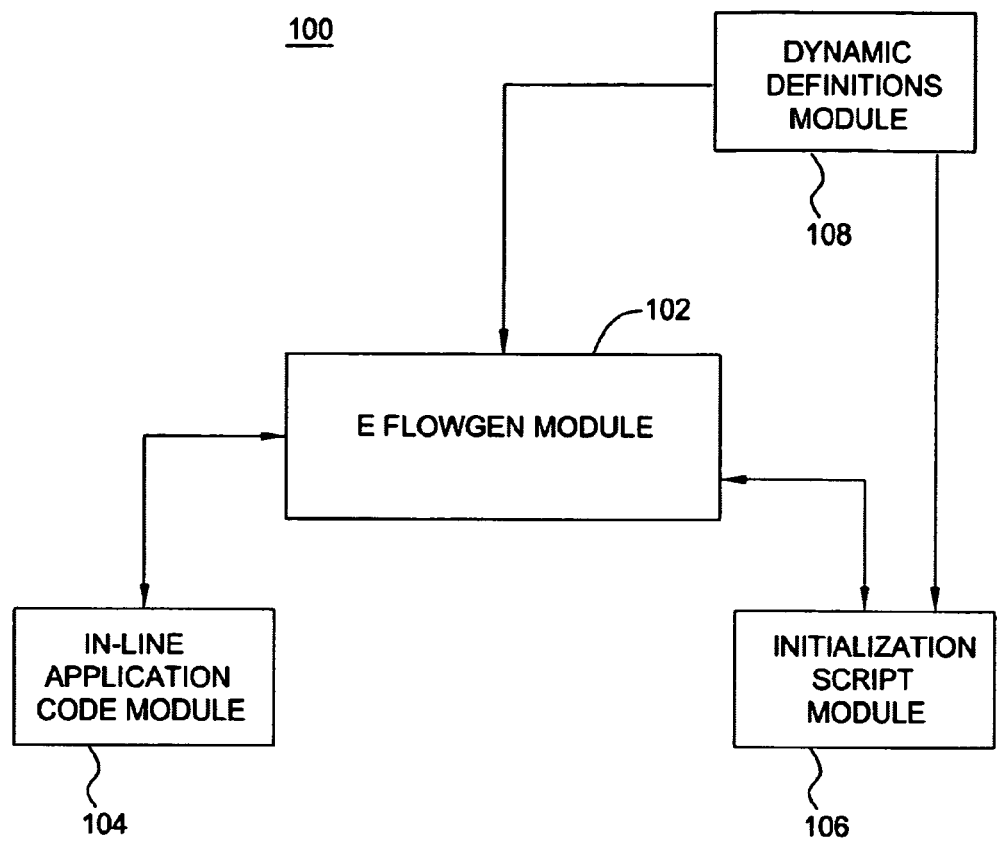
FIG. 4 is a block diagram of the remote processing center.

Referring to FIG. 4, a block diagram of a software architecture 100 for a dynamic, open, alert management infrastructure in accordance with preferred embodiments of the present invention is shown. An infrastructure module 102 (labeled "eFlowgen") provides core infrastructure functionality, including implementation of the alert processing engine 34, and need not be specialized to alert management applications. An inline application code module 104 (in conjunction with an initialization module 106, described below) defines an alert management application, including the overall alert analysis and reporting process 50 described above with reference to FIG. 2. Initialization script module 106 complements application code module 104, by defining, for a particular application instance, the specifics of the input/output transport connections and specifics of the logical alert processing clauses corresponding to the process 50. A dynamic definitions module 108 represents dynamic changes submitted by users via the remote management interface 36, such as configuration changes and other extensions as previously discussed; the functionally dynamic definitions module 180 are comparable to initialization script module 106, except for being dynamically submitted and incorporated into the running application.

A detailed functional specification for a software infrastructure corresponding to eFlowgen module 102 is included in the Appendix, incorporated herein.

Figure 5:
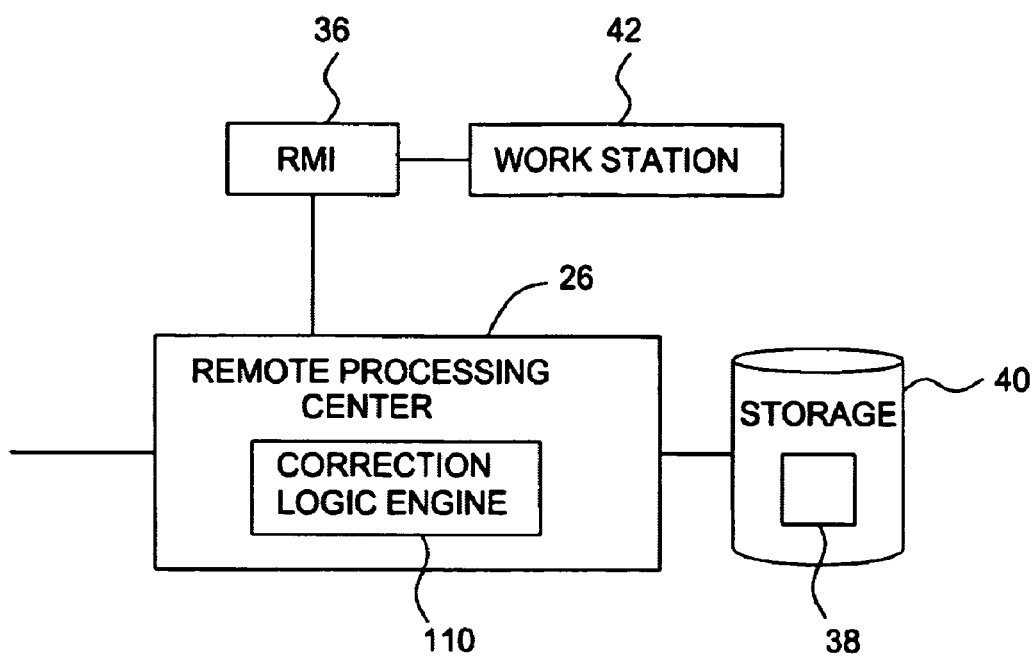
FIG. 5 is a block diagram of a software architecture for the alert management system.

In another embodiment, referring to FIG. 5, the remote processing center 26 includes a correlation logic engine 110. The correlation logic engine 110 accesses and compares incident reports in database 38 and attempts to provide intelligent assistance to end-users in the analytical task of discovering patterns and making sense of alert data. The correlation engine logic 110 looks for key attribute relations in common for different incidents, such as incidents targeting a single host machine over a relatively short time frame, or incidents reflecting attacks or anomalies coming from a particular source machine. Automatically correlating separate incidents helps end-users recognize more quickly that a particular machine is under serious attack or that some other machine is a hostile "bad guy," for example, and the end-users can then take appropriate defensive action.

Another correlation technique residing in the correlation logic engine 110 looks for interrelated vulnerabilities, applying rule-based knowledge to look for groups of distinct incidents that can inferentially be interpreted as related parts of a single, coordinated attack. For example, rules matching patterns of incidents that look like a chain over time, where the target of an earlier incident becomes the source of a subsequent incident, may allow correlation logic engine 110 to conclude that these likely are not unrelated incidents, and that a "worm" infection appears to be spreading.

In an embodiment, the correlation logic engine 110 incorporates statistical inferential methods. The correlation logic engine 110 attempts to draw conclusions automatically based on received intrusion incident reports. The correlation logic engine 110 produces reports for the end-user indicating correlation found.

The alert manager 24 and other components of the alert management network 10 may be implemented and executed on a wide variety of digital computing platforms, including, but not limited to, workstation-class computer hardware and operating system software platforms such as Linux, Solaris, FreeBSD/Unix, and Windows-NT.

Figure 6:
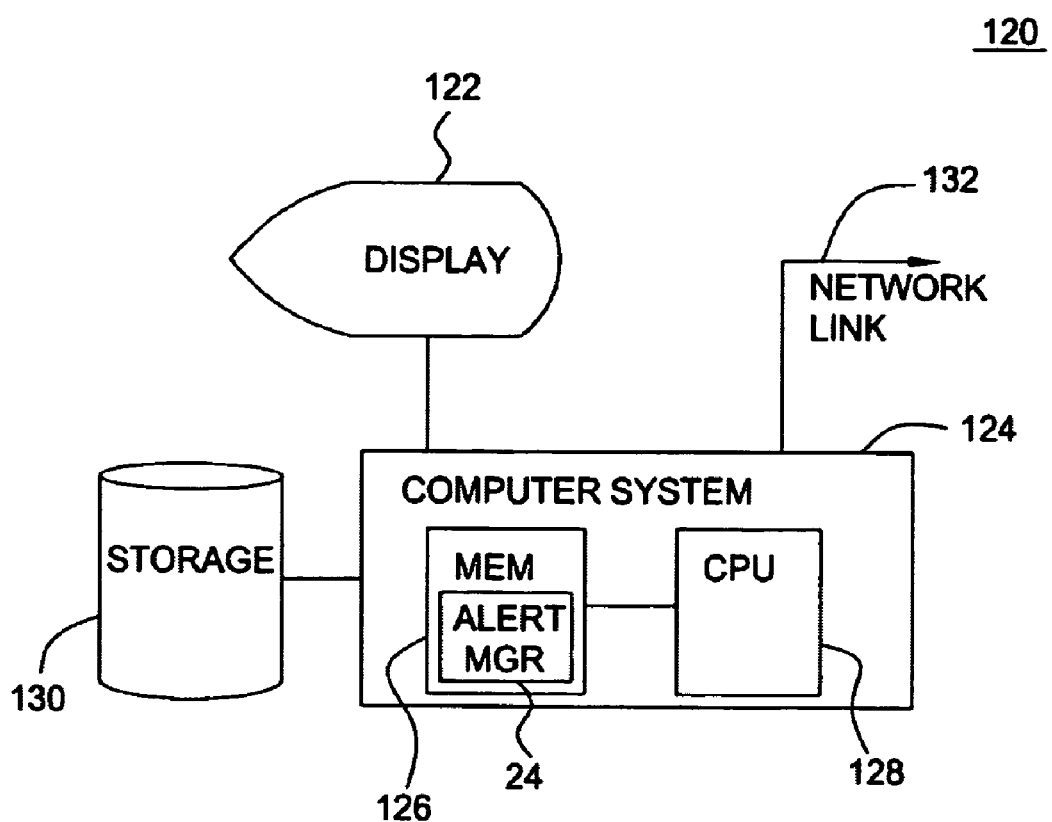
FIG. 6 is a block diagram of a computer platform.
Like reference symbols in the various drawings indicate like elements.

Referring to FIG. 6, a computer platform 120 suitable for hosting and executing the alert management process 50 includes a display device 122 connected to a computer 124. The computer 124 includes at least a memory 126 and a central processing unit (CPU) 128. The computer 124 includes a link to a storage device 130 and a network link 132.

The storage device 130 can store instructions that form an alert manager 24. The instructions may be transferred to the memory 126 and CPU 128 in the course of operation. The instructions for alert manager 24 can cause the display device 122 to display messages through an interface such as a graphical user interface (GUI). Further, instructions may be stored on a variety of mass storage devices (not shown).

Other embodiments are within the scope of the following claims:

What is claimed is:

1. A system for managing network alerts comprising:
   data connections configured to receive network alerts from network sensors;
   alert processing logic coupled to the data connections and further comprising:
      alert integration logic configured to integrate the network alerts, the alert integration logic comprising a consolidation component that is configured to identify multiple received alerts as indicative of a common incident and consolidate the multiple received alerts into a consolidated incident report that is indicative of the incident;
      report generation logic coupled to the alert integration logic;
      distribution logic coupled to the report generation logic; and
      a remote management unit coupled to the alert processing logic and being configured to dynamically modify the alert processing logic.

2. The system of claim 1 wherein the data connections are secure electronic communication lines.

3. The system of claim 1 wherein the data connections are dynamically configurable through the remote management unit.

4. The system of claim 1 wherein the network sensors include heterogeneous sensors, and further comprising an alert formatting component that is configured to convert an alert to a common format, the common format being used by the alert processing logic.

5. The system of claim 1 wherein the alert integration logic comprises an alert formatting component configured to convert alerts to a common format used by the alert processing logic, wherein the alert formatting component is configurable through the remote management unit to update an operational characteristic of the alert formatting component.

6. The system of claim 1 wherein the alert integration logic comprises a filtering component that is configurable through the remote management unit.

7. The system of claim 1 wherein the alert integration logic comprises a prioritizing component that is configured to assign an indication of importance to an alert based on a characteristic of the alert, the remote management unit being configured to alter the prioritizing component such that a different indication of importance will be assigned to the alert based on the characteristic.

8. The system of claim 1 wherein the alert integration logic comprises a relevancy component that is configured to assign an indication of a relevance of an alert to a sensor generating the alert, the relevancy component being configurable through the remote management unit to update the relevancy component according to a characteristic of the sensor.

9. The system of claim 1 wherein the alert consolidation component is configured to consolidate multiple alerts produced from a single network sensor.

10. The system of claim 1 wherein the alert consolidation component is configured to consolidate alerts received from multiple network sensors.

11. The system of claim 1 wherein the report generation logic is configured to generate formatted reports for each of one or more subscribers, and wherein the distribution logic comprises:
   subscriber logic configured to establish a communication link to each of the subscribers; and
   communication logic configured to send the corresponding formatted report to each of the subscribers.

12. The system of claim 1 wherein the distribution logic is adjustable through the remote management unit.

13. The system of claim 12 wherein the distribution logic is dynamically modifiable so as to add subscribers and remove subscribers.

14. The system of claim 1 wherein the remote management unit comprises an interactive control user interface hosted at a remote processing center, and a configuration engine hosted locally with the alert processing logic.

15. The system of claim 1 being hierarchical, wherein the data connections are further configured to receive the output from one or more alert management systems, and wherein the alert integration logic is further configured to integrate the output.

16. An apparatus for managing network alerts comprising:
   alert integration logic configured to integrate network alerts received from network sensors, the alert integration logic comprising a consolidation component that is configured to identify multiple received alerts as indicative of a common incident and consolidate the multiple received alerts into a consolidated incident report that is indicative of the incident;
   output generation logic coupled to the alert integration logic and configured to generate output reflecting the integrated network alerts; and
   a dynamic configuration engine configured to receive and to execute remote requests for modification of the alert integration logic.

17. The apparatus of claim 16 wherein the alert integration logic comprises one or more alert analysis components selected from the following group: an alert filtering component configured to identify alerts matching predetermined criteria, an alert prioritizing component configured to assign an indication of importance to an alert, and an alert relevancy component configured to assign an indication of a relevance of an alert to a sensor generating the alert.

18. The apparatus of claim 16 wherein the remote requests are received by the configuration engine from a remote management unit.

19. The apparatus of claim 16 wherein the configuration engine comprises a run-time command interpreter.

20. The apparatus of claim 16 wherein the network sensors include heterogeneous sensors.

21. An apparatus for managing network alerts comprising:

alert integration logic configured to integrate network alerts received from network sensors, the alert integration logic comprising a consolidation component that is configured to identify multiple received alerts as indicative of a common incident and consolidate the multiple received alerts into a consolidated incident report that is indicative of the incident;

output generation logic coupled to the alert integration logic and configured to generate output reflecting the integrated network alerts; and a dynamic configuration engine configured to receive and to execute remote requests for modification of the output generation logic.

22. The apparatus of claim 21 wherein the output generation logic is further configured to distribute the output to one or more remote subscribers.

23. The apparatus of claim 21 wherein the remote requests are received by the configuration engine from a remote management unit having an interactive user interface.

24. The apparatus of claim 21 wherein the configuration engine comprises a run-time command interpreter.

25. The apparatus of claim 21 wherein the network sensors include heterogeneous sensors, and further comprising an alert formatting component that is configured to convert an alert to a common format, the common format being used by the alert integration logic.

* * * * *